(12) United States Patent
Kernan et al.

(10) Patent No.: US 12,706,832 B1
(45) Date of Patent: Aug. 11, 2026

(54) GLOBAL ENDPOINTS

(71) Applicant: Amazon Technologies, Inc., Seattle, WA (US)

(72) Inventors: Chase Kernan, Seattle, WA (US); Christopher Magee Greenwood, Seattle, WA (US); Karan Hemant Kothari, Lynnwood, WA (US); Jeffrey Daniel Solinsky, Whitewright, TX (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 18/980,905

(22) Filed: Dec. 13, 2024

(51) Int. Cl.
*H04L 45/02* (2022.01)
*H04L 41/16* (2022.01)

(52) U.S. Cl.
CPC ............. *H04L 45/08* (2013.01); *H04L 41/16* (2013.01)

(58) Field of Classification Search
CPC ................................ H04L 41/16; H04L 45/08
See application file for complete search history.

(56) References Cited

U.S. PATENT DOCUMENTS

| | | | | |
|---|---|---|---|---|
| 10,178,033 | B2 * | 1/2019 | Bellessa | H04L 63/1458 |
| 2025/0094240 | A1 * | 3/2025 | Meng | G06F 9/505 |
| 2026/0046317 | A1 * | 2/2026 | Crabtree | H04L 63/104 |

* cited by examiner

*Primary Examiner* — G. C. Neurauter, Jr.
(74) *Attorney, Agent, or Firm* — Nicholson DeVos Webster & Elliott LLP

(57) ABSTRACT

Techniques for supporting a token based service are described. In some examples, a token based service such as a foundation model service supports global endpoints. Global endpoints for the token based service are provided with a global quota that is exposed per account, per model. Invocations against a global endpoint consume against the global quota.

20 Claims, 19 Drawing Sheets

```
{
  // THIS IS THE SET OF RULES THAT ARE EVALUATED TO
  // DETERMINE THE PRIORITY CLASS OF A GIVEN INFERENCE
  // REQUEST.  RULES HAVE A FIXED SET OF KEYS AND OPERATORS
  // AVAILABLE TO THEM.
  "PRIORITYRULES": [
    {
      // CONDITIONS ARE AND'ED TOGETHER FOR A GIVEN RULE
      "CONDITIONS": [
        {"KEY": "IS_EXTERNAL", "OP": "=", "VALUE": 1},
        {"KEY": "ACCOUNT_SCORE", "OP": ">=", "VALUE": 300}
      ],
      "PRIORITYCLASS": 1
    },
    {
      // CONDITIONS ARE AND'ED TOGETHER FOR A GIVEN RULE
      "CONDITIONS": [
        {"KEY": "IS_EXTERNAL", "OP": "=", "VALUE": 1},
        {"KEY": "ACCOUNT_SCORE", "OP": ">=", "VALUE": 200}
      ],
      "PRIORITYCLASS": 2
    },
    {
      // CONDITIONS ARE AND'ED TOGETHER FOR A GIVEN RULE
      "CONDITIONS": [
        {"KEY": "IS_EXTERNAL", "OP": "=", "VALUE": 0},
        {"KEY": "IS_PRODUCTION", "OP": "=", "VALUE": 1}
      ],
      "PRIORITYCLASS": 2
    },
    {
      // CONDITIONS ARE AND'ED TOGETHER FOR A GIVEN RULE
      "CONDITIONS": [
        {"KEY": "IS_EXTERNAL", "OP": "=", "VALUE": 0},
        {"KEY": "IS_PRODUCTION", "OP": "=", "VALUE": 0}
      ],
      "PRIORITYCLASS": 3
    }
  ],
  // THIS IS THE SET OF ACTIONS THAT ARE TAKEN FOR THE
  // COHORT OF ACCOUNTS/REQUESTS CLASSIFIED IN A GIVEN
  // PRIORITY CLASS.
  "PRIORITYACTIONS": [
    {
      "PRIORITYCLASS": 1,
      "ACTIONS": [
        { "TYPE": "RESERVEDCONCURRENCY", "VALUE": 200 }
      ]
    },
    {
      "PRIORITYCLASS": 3,
      "ACTIONS": [
        { "TYPE": "LIMITCONCURRENCY", "VALUE": 100 }
      ]
    }
  ]
}
```

*FIG. 4*

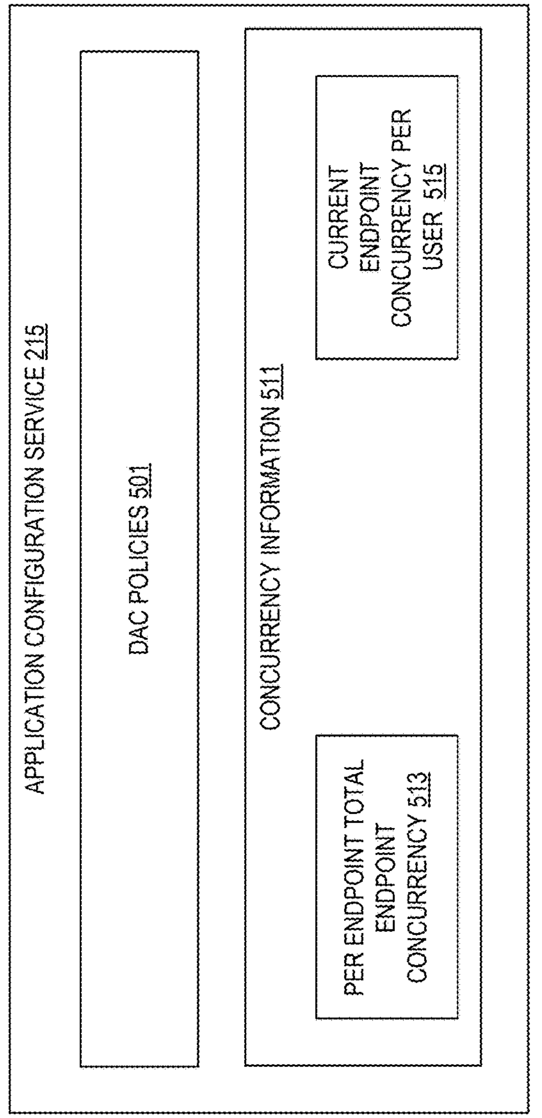
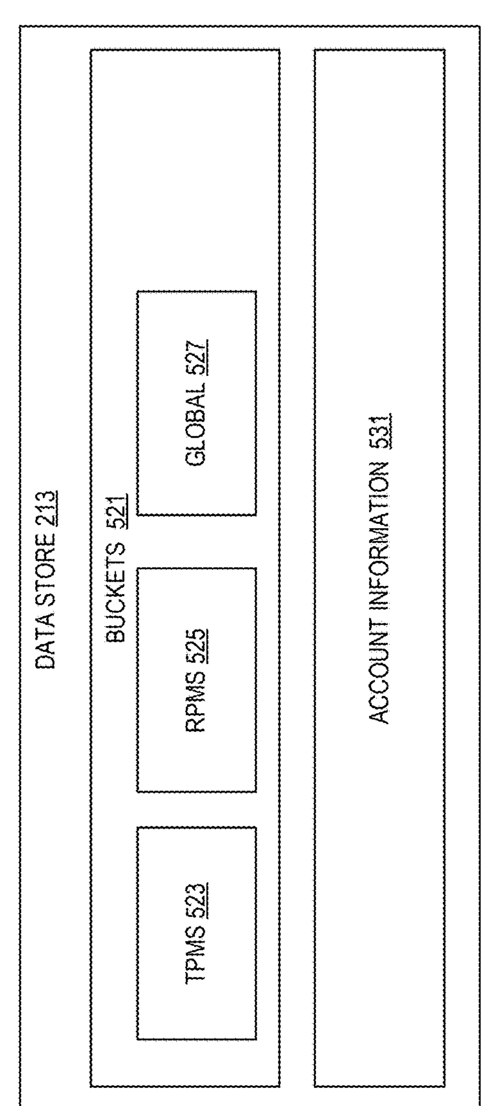
FIG. 5

GLOBAL ENDPOINTS

BACKGROUND

A cloud provider network (also referred to herein as a provider network, service provider network, etc.) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name System (DNS)), application resources (e.g., databases, application build/deployment services), access policies or roles, identity policies or roles, machine images, routers and other data processing resources, etc.

These and other computing resources can be provided as services, such as a hardware virtualization service that can execute compute instances, a storage service that can store data objects, etc.

BRIEF DESCRIPTION OF DRAWINGS

Various examples in accordance with the present disclosure will be described with reference to the drawings, in which:

FIG. 4 illustrates examples of a DAC policy.

FIG. 5 illustrates examples of an AppConfig service and data store.

DETAILED DESCRIPTION

The present disclosure relates to methods, apparatus, systems, and non-transitory computer-readable storage media for shared resource access.

A foundation model (FM) service serves an inference application programming interface (API) to users by running inference requests on a multi-tenant fleet of compute backends (note that accelerator-based or CPU-based backends may be used). Compute backends are expensive, take a long time to procure/provision, and are often scarce. Currently some FM services to turn away traffic (i.e., issue an Insufficient Capacity Exception (ICE)) even though there exists backend capacity in the fleet that could have served the traffic. A single customer request can consume significant backend capacity for a variable length of time—sometimes seconds, sometimes longer. And often the busy-ness of a backend is binary—it can serve exactly one request at a time so at any moment is either fully busy or fully idle.

Examples detailed herein allow a FM service (or other service) better utilize compute resources through admission control and routing. For admission control, when an inference request comes into the FM service it needs to determine if it should be serviced by the available capacity. If the available capacity is insufficient to serve all requests, the service should make prioritization decisions about which requests are served, and which are rejected. Further, when a request comes in, it should be routed to the "best" backend that can serve that request. This routing decision may take into account metadata such as the current load, heat, health, and other factors of each backend.

Figure 1:
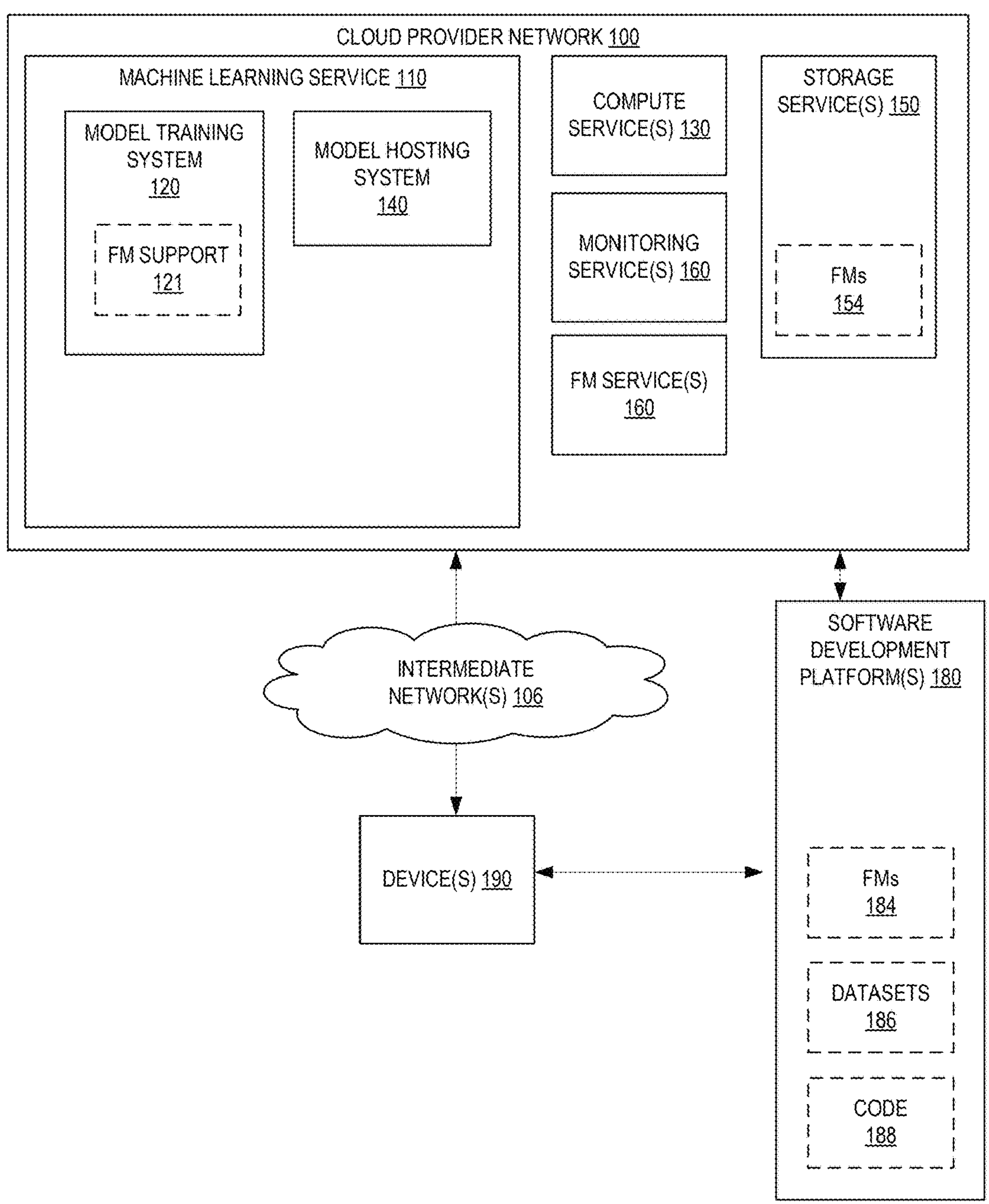
FIG. 1 illustrates examples of a cloud provider network that supports the use of throttling for a service.

FIG. 1 illustrates examples of a cloud provider network that supports the use of throttling for a service. Throttling allows for a service to dynamically alter how it handles traffic such as requests.

The cloud provider network 100 supports a machine learning service 110 that includes a model training system 120 which may be used to train, fine-tune, or pre-train a machine learning (ML) model. In some examples, the model training system 120 includes support for a foundation model (FM) 121 to be trained, etc. The machine learning service 110 also includes a model hosting service 140 to host trained models.

A FM service 160 is provided. This service allows a user to call an FM, train a FM, etc. In some examples, the FM service 160 is supported by a plurality of backends. For example, a backend may be used for a particular FM. As such, a user can interact with the FM service 160 and it will call the appropriate FM. FMs 154 may also be stored in storage service(s) 150 or be accessed from software development platform(s) 180 (e.g., FMs 184) which may also have datasets 186 and/or code 188 to be used to train, fine-tune, etc. The machine learning service 110 and/or FM service(s) 160 may be executed on compute service(s) 130.

The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users (e.g., via device(s) 190) can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service 130" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

In some examples, one or more monitoring service(s) 160 may be used to track the progress of training a ML model.

the cloud provider network 100 provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name System (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of cloud provider networks 100 can use one or more user accounts that are associated with a customer account, though these terms can be used somewhat interchangeably depending upon the context of use. Cloud provider networks are sometimes "multi-tenant" as they can provide services to multiple different customers using the same physical computing infrastructure; for example, virtual machine instances may be concurrently hosted for different customers using a same underlying physical host computing device.

Users (e.g., device(s) 190) can interact with a cloud provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the cloud provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, cloud provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the cloud provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the cloud provider network 100. In some examples, these resources can be maintained in a "ready" state (e.g., having a pre-initialized runtime environment configured to execute the serverless functions), allowing the serverless functions to be executed in near real-time.

A hardware virtualization service (referred to in various implementations as an elastic compute service, a virtual machines service, a computing cloud service, a compute engine, or a cloud compute service) can enable users of the cloud provider network 100 to provision and manage compute resources such as virtual machine instances. Virtual machine technology can use one physical server to run the equivalent of many servers (each of which is called a virtual machine), for example using a hypervisor, which can run at least partly on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. A VPC can be defined by at least its address space, internal structure (e.g., the computing resources that comprise the VPC, security groups), and transit paths, and is logically isolated from other virtual networks in the cloud. A VPC can span all of the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

Figure 2:
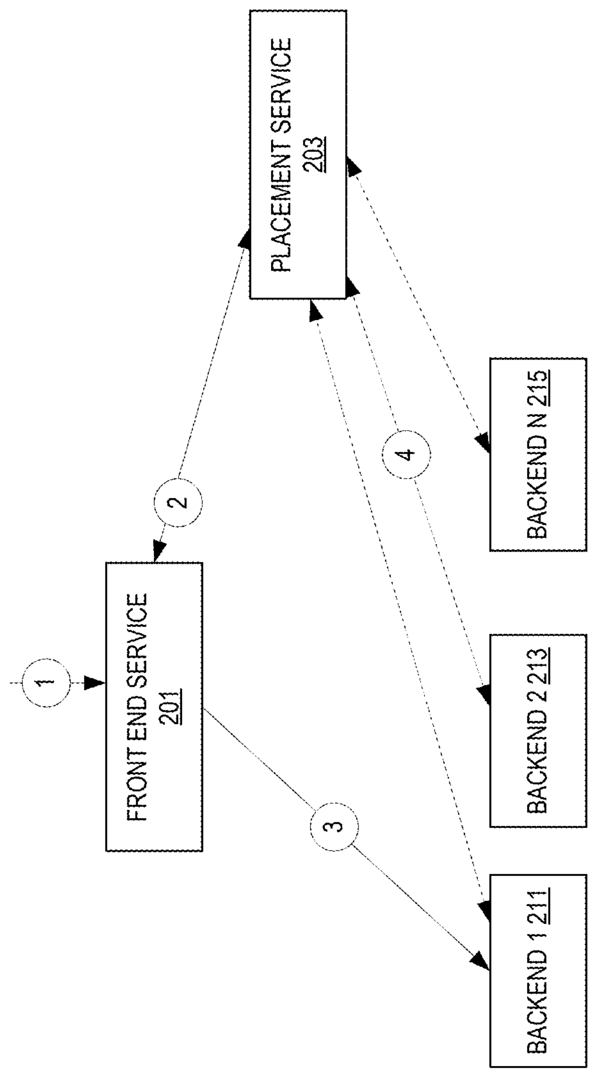
FIG. 2 illustrates examples of placement service usage.

In some examples, admission control and routing for a service (e.g., FM service(s) 160) is performed using a placement service. FIG. 2 illustrates examples of placement service usage. A frontend service (FES) 201 receives requests and asks the placement service 203 to decide what to do with the request. First, should the request even be served at all? Second, if so, which of the backends (e.g., backend 1 211, backend 2 213, or backend N 215) should the request be routed to. The FES 201 provides input parameters to the placement service 203 describing the inference request, such as input token count, model/model variant, end customer/resource identifiers, and relevant infrastructure constraints (such as VPC or AZ restrictions if these exist).

On start-up, the placement service 203 queries a control plane to learn what backends exist and then queries each backend node to learn about capacity/tenancy information. At circle 1, a user makes a request via the FES 201.

The FES 201 calls the placement service 203 to get an admission control and placement/routing recommendation and the placement service 203 recommends an ordered list of backend candidates at circle 2.

In some examples, the FES 201 iterates through the backend recommendations in order, attempting to forward the inference request to each recommended backend and falling back if a backend rejects at circle 3.

As backends accept inference requests, they issue events back to the placement service 203 to indicate tenancy updates at circle 4. They also issue similar events to the placement service 203 to indicate that requests have completed or failed.

In some examples, the placement service 203 will be a single-leader system. In steady state every placement request will flow into a single placement service host (the leader), which will have a full view of both up-to-date backend state and the recommendations it has made to the frontend fleet. The placement service 203 leader will periodically poll the backend fleet for capacity information to both seed initial state and serve as an anti-entropy mechanism. It will also receive events pushed from the backend nodes to get mostly real-time information as to changes to the capacity situation on each backend.

A single-leader design allows the placement service 203 to make placement decisions based not only on an up-to-date view of the backend fleet, but also on a view of in-flight placement decisions. In some examples, the placement service 203 uses a placement lease mechanism. When the placement service leader makes a placement recommendation it will expect its first recommendation to succeed and will provisionally mark the recommended backend's capacity as consumed. This will be an in-leader, in-memory operation and will have a relatively short time-to-live. The backend that ultimately accepts the request will issue an event to the leader informing it as to the final request placement. So, the state will be reconciled by the first recommended backend "redeeming" the capacity lease, a subsequent recommended backend invalidating the capacity lease of the first, or the capacity lease time-to-live away and that virtually-reserved capacity on the backend being released for re-placement.

Cloud provider network services protect customers and the service itself from the unwarranted load of any one customer or workload. Services commonly use two strategies to achieve this: 1) limits and/or 2) admission control. Limits bound the amount of work accepted by the service from a single workload, customer, or organization. Admission control is a general term for a mechanism with which the service accepts the "right" work and turns away the "wrong" work. Admission control takes into account customer signals like limits, current and historical usage, and magnitude of the request as well as service signals like capacity.

Examples detailed herein describe the use of limits and admission control for a service. In the examples below, the service that allows a user to choose from one or more foundation models (FMs) and build generative artificial intelligence applications using the FMs. The FMs may be customized such as being fine-tuned or made to use retrieval augmented generation (RAG). In some examples, the service is serverless. In some examples, below this service is called a FM service.

Quota admission control enforces customer-visible RPM and TPM quotas, returning a client error if quotas are exceeded. These quotas are defined per account, per model, and per region. Capacity admission control enforces concurrency limits against a downstream hosting fleet, returning a service error if the fleet is too busy to accept the request. Concurrency limits are defined per model, per region.

Limits and admission control may be implemented in the placement service 203 or in a FES 201. In some examples, limits are implemented through an integration with service quotas (SQs) or limits. A SQ is the maximum value for a resource, action, or item for an account. Each service (e.g., the FM service) defines its quotas and has default values for the quotas. SQs can be increased by request. A SQ service distributes limits configured by the FM service and the customer to an admission control service via an application configuration (AppConfig) service.

The AppConfig service allows for the deployment and management of application configurations. AppConfig allows for the implementation of an allow list or block list of users, feature flags to release new capabilities, etc.

The admission control service implements throttling logic to accept and turn away work in accordance with limit values. The admission control service uses a datastore so that each host has a consistent view of configured and consumed limits for each customer.

On admission control, a current approach of admission control based on endpoint concurrency is necessary, but insufficient. Note that concurrency is the number of requests that are being served and the total concurrency is the total number of requests that can be served. Capacity-based admission control allows for the protection of the underlying model hosting infrastructure from excess load but does not allow the control of which work is accepted when a subset of requests must be rejected. For many services this is an acceptable behavior of admission control, as for many services operating under capacity duress is the exception not the rule. But for the FM service, given the high demand for the resources and the scarcity of model hosting capacity, frequently the service operates where it cannot serve all requested work, even after turning away requests outside of configured service quotas. As such, in some examples, the admission control of the placement service 203 is configured to favor certain work over other work when only a subset of requests can be served using dynamic admission control.

Figure 3:
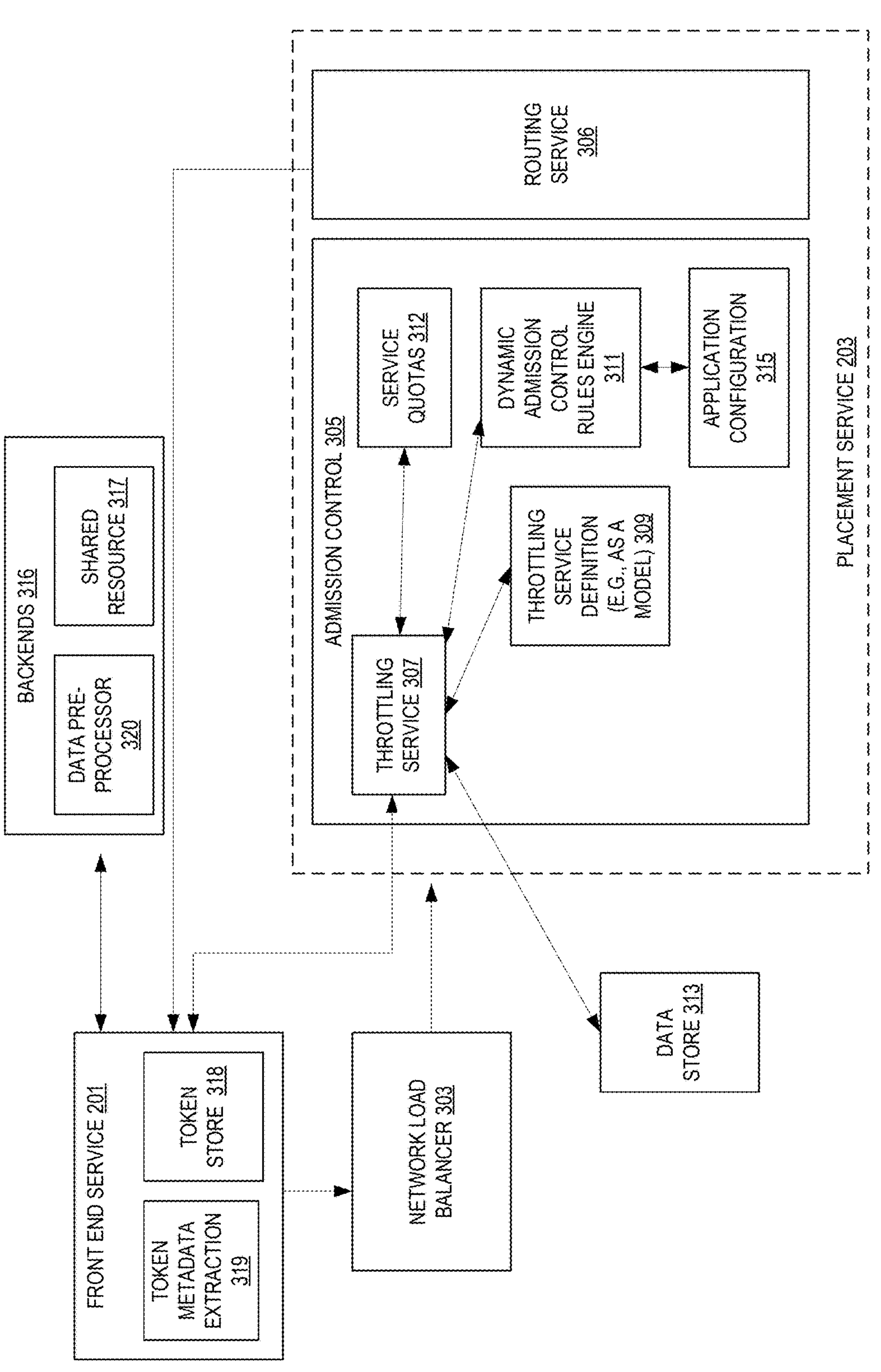
FIG. 3 illustrates examples of admission control and placement for a shared resource service of a cloud provider network service.

FIG. 3 illustrates examples of a admission control and placement for a shared resource service of a cloud provider network service. In some examples, the shared resource is one or more FM models.

While the placement service 203 is shown as being external to the FES 201, in some examples at least some aspects of the placement service 203 are integrated into the FES 201. The placement service 203 performs routing (e.g., using routing service 306) and admission control (e.g., using admission control 305) for the shared resource 317 (e.g., a foundation model) that is hosted by one or more backends 316.

In some examples, one or more backends 316 support data pre-processing (e.g., tokenization) using one or more data pre-processors 320 that are separate from the shared resource 317 (e.g., tokenization performed separate than the model itself and may be on different backends). Tokens or information about tokens can be provided from a data pre-processor 320 to the FES 201 to help in the admission control and/or routing decision. For example, token information (such as the number of tokens) may be used as a part of the metadata used to make a dynamic admission control decision. Tokens may also provide modality information (e.g., text, image, etc.) which may be used by a routing service to decide which backend to send a request to. In some examples, the FES 201 stores tokens and/or token information in a token store 318.

In some examples, the backends 316 are heterogeneous. For example, one or more of the backends 315 may have a first hardware configuration and/or resource support, a different one or more of the backends 315 may have a second hardware configuration and/or resource support, etc. In some examples, the heterogeneity can be viewed as a "BIG" and "little" style where the same resource type is supported, but the "BIG" backends have more capable compute and/or memory resources available. In some examples, a request is converted to use heterogenous resources (e.g., some of the request is performed using host "A" and some of the request is performed using host "B").

A user makes a request to use the shared resource 317 through its FES 201. The FES 201 interacts with a network load balancer 303 which determines which instance of the placement service 203 to use (e.g., the leader).

The placement service 203 performs access control via a throttling service 307 (of an admission control service 305) which throttles requests (e.g., on a minute basis), throttles concurrent connections, etc. The placement service 203 attempts to be fair and does not allow other users to affect throttling except for service level throttling and routing via routing service 306. The throttling service 307 takes in SQ information 312, a dynamic admission control (DAC) decision from a DAC control rules engine 311, a data store 313 is used to maintain throttling information, and SQs 312. In some examples, limits are employed in the form of tokens per minute (TPM) or requests per minute (RPM) throttling using SQs 312 and admission control in the form of concurrency or connection throttling. TPM and/or TRM throttling may be model based, model-account based, input TPM based, and/or output TPM based.

Throttling may be performed using the buckets (e.g., request-based throttling) and/or using concurrency (e.g., concurrency-based throttling). For buckets, a sliding window algorithm or token bucket algorithm is used for throttling as detailed below. For concurrency fairness the priority classes are tracked, and the balancing is based on classes of workloads. For example, batch processing will yield concurrency to on-demand workloads.

In some examples, the throttling service 307 is defined by a throttling service definition 309. In some examples, a smithy model is used to define the throttling service 307. The throttling service definition 309 defines API calls to be used for the service. In some examples, there is an API call for "ApplyThrottle," "ReconcileThrottle," and "ResolveThrottle" which are used to create a throttle, update a throttle, and delete a throttle. For example, ApplyThrottle creates a resource specific to the call that applies some throttle (takes tokens from token buckets—RPM, TPM, connection, etc.), ReconcileThrottle takes more tokens from token buckets, and ResolveThrottle releases a connection.

The data store 313 is an in-memory data store in some examples. The data store 313 provides persistence options, allowing data to be stored on disk while retaining the benefits of in-memory performance. In some examples, the data store 313 supports atomic operations. The data store 313 is used for handling connection-based throttling.

In some examples, the data store 313 stores one or more of the following: a TPM bucket for a model, a TPM bucket for an account, a RPM bucket for a model, a RPM bucket for an account, model input TPM information, model output TPM information, etc.

In some examples, connection-based throttling uses a sliding window algorithm. A sliding window algorithm is a common approach used in rate limiting systems to control the rate at which requests or events can occur. It ensures that a maximum number of events is allowed within a specified time window, while rejecting any additional events that exceed the limit.

For the sliding window algorithm, a time window defines a fixed duration of time during which the rate limit applies. A window size determines the maximum number of events allowed in the time window where "events" is model connections and are removed after the connection is completed. A sliding window is created to track the events, in buckets, within the time window. Here the sliding windows are skeys within the data store 313 for how many connections were started within that minute and are still ongoing.

Whenever a new event or request arrives, the check is made of if the number of events within the sliding window exceeds the window size. If the limit is not reach, the event is allowed and added to the sliding window. If the limit is reached, the algorithm rejects the event. As time progresses, the sliding window slides along with removing the events that fall outside the time window. This ensures that stale connections (or connections that were not properly released are thrown out)

Connection based throttling features a modification to the above sliding window algorithm in that events (connections) will be added the buckets when the request starts and removed when the request ends. Removing events from the bucket is not typically in the standard algorithm.

In some examples, a token bucket algorithm is a method used in networking to control the rate of network traffic (e.g., for request-based throttling). The token buck algorithm works as follows:

1. A token is added to the bucket every 1/r seconds, where r is the desired output rate. The token bucket has a specified capacity. If the bucket is full at the time a token arrives, the token is discarded.
2. When a network packet arrives to be sent, it can only be transmitted if there are enough tokens in the bucket to cover its "cost" (which might be the packet's size in bytes, for instance). If there are enough tokens, the packet is transmitted and its cost in tokens is removed from the bucket. If there aren't enough tokens, the packet must wait.
3. The token bucket algorithm allows for bursts of traffic. If tokens have built up in the bucket because there hasn't been much traffic, a series of packets can be sent in quick succession, up to the number of tokens available in the bucket.

In other words, the token bucket algorithm works like an allowance or a budget. You earn tokens at a certain rate, and you spend them when you send packets. If you've been saving up tokens, you can spend them all at once in a burst of activity. If you're out of tokens, you have to wait until you've earned more.

Both requests-based and token-based throttling will use the token bucket algorithm for throttling. Adding "tokens" every 1/r will be done be simply storing the last time the bucket was updated (or debited). At this time, how many tokens the bucket should be filled to can be computed, then the bucket is debited for the current request if there is enough capacity to debt.

In some examples, the placement service 203 performs dynamic admission control (DAC) using a dynamic admission control rules engine 311. DAC uses request metadata and the service configuration to influence a set of token buckets that are applied for each request. Request metadata will be passed to the admission control service 305 from FES 201 on an invoke model API call and the service configuration will be persisted in an application configuration (AppConfig) service 315 describing to the admission control service 305 rules for admission control, connection limiting, and throttling.

Examples of behaviors to achieve through DAC may include one or more of: if under high load, give at least X concurrency to population A; a roughly even/random distribution of connections within an account population; if under low load, allow the general population to consume up to total concurrency; and/or if under high load, allow population A to contend freely with remaining concurrency.

The dynamic admission control rules engine 311 uses a DAC policy to determine an access control decision that it provides to a throttling service 307. In DAC policy includes one or more priority rules and one or more priority actions. Priority rules assign a priority level for each request. These rules are defined in the AppConfig service 315 (e.g., as a DAC policy) and represent conditional expressions evaluated on each incoming invoke request. Examples of metadata that may be used in priority rules are:

Internal account vs. external account

Production account vs. non-production account (for internal accounts)

Account score that indicates a confidence in the account being fraudulent

Account risk status

Trailing N days service usage—if consistently using the FM service, in some examples, the FM service will increase limit and if not consistently using the FM service decrease the limit For example, priority rules would allow a user to express a rule like "mark internal, non-prod accounts as priority 3."

Priority actions are throttling-related actions taken for requests of a specific priority class. The placement service 203 will treat all requests marked with a given priority in the same "bucket," which is notably different than limits for which an account consumes from an account-specific quota. Some actions that may be configured to operate on a priority are:

Limit consumption to N units of concurrency (where concurrency is the number of in-flight (concurrent) requests for a service)

Reserve N units of concurrency

Limit consumption to N % of total consumption

Reserve N % of concurrency

For example, priority actions would allow the business to express a rule like "reserve 20% of concurrency for priority 2 requests" or "limit priority 4 requests to 10 overall concurrency."

FIG. 4 illustrates examples of a DAC policy. The priority rules set four different classes based on a set of conditions per class. Note that each priority class can have different conditions. The priority actions define specific actions for "priorityclass 1" and "priorityclass 3." As such, when a request falls under one of these priority classes, the defined action is to be performed by the placement service 203.

FIG. 5 illustrates examples of an AppConfig service and data store. In this illustration, the AppConfig service 315 is used to store one or more DAC policies 501 and concurrency information 511 such as the total endpoint concurrency 513 per endpoint and current endpoint concurrency per user 515. This concurrency information may be updated has each request is handled.

The data store 313 is used to maintain one or more buckets 521. In some examples, there is a plurality of tokens per minute (TPM) buckets 523 and a plurality of requests per minute (RPM) buckets 525. In some examples, there is also a global token bucket 527 which is discussed later.

The TPM buckets 523 may include a bucket for a particular model, a bucket for particular model-account pair, a bucket for a particular model input, a bucket for a particular model output TPM, etc. The RPM buckets 525 may include a bucket for a particular model, a bucket for particular model-account pair, etc. These buckets may be update when an invoke model request is received, periodically without user requests (e.g., updating as traffic is received/sent, etc.).

In some examples, the data store 313 also stores account information 531 such as if the account is a production account or non-production, if the account is external or internal, an account score, an account risk status, trailing days of usage of the service, etc.

Figure 6:
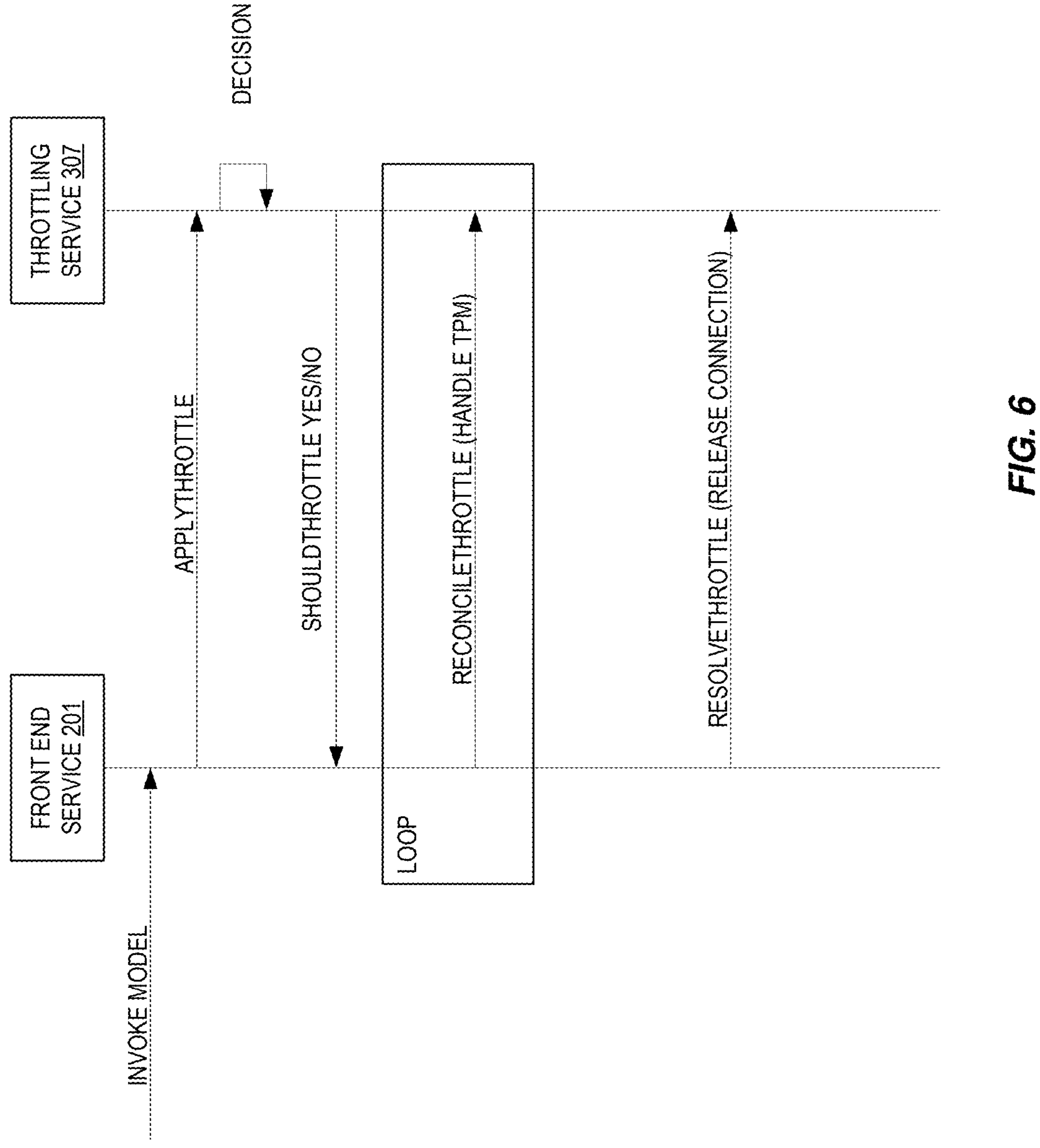
FIG. 6 illustrates examples of API calls to the throttling service.

FIG. 6 illustrates examples of API calls to the throttling service. In this example, a user has called the FES 201 to invoke a model. The FES 201 then interacts with the throttling service for an access control decision and route. In some examples, a "ThrottledResource" object is created when a connection is created.

An "ApplyThrottle" API call establishes the connection. In some examples, the ApplyThrottle API call includes one or more of: an identifier of a namespace, an identifier of a model, an idempotency key (e.g., a hash representation of an entire event or specific configured subset of an event), a set of throttles to apply and their dimension keys and consumption levels, additional request metadata (e.g., account id, c score, is external account, is production internal account, is a batch, is cross region, business group account, is a client production, etc.) used to determine a priority class. Throttles may be of a particular type (e.g., token bucket or concurrency), have a value (e.g., how much is the current request attempting to consume out of the throttle, a dimension, an indication of if tokens in a token bucket should be deducted).

The throttling service 307 returns, when there is not an error, a throttle type, throttle result, resource ID, a resolved resource type (e.g., on demand, batch, PT_V2), throttle reason, and, in some examples, a request ID. The FES 201 may use a ReconcileThrottle API call to help with the accounting for TPM throttling. In some examples, the ReconcileThrottle API call includes one or more of: an identifier of a namespace, an idempotency key (e.g., a hash representation of an entire event or specific configured subset of an event), a set of throttles to apply and their dimension keys and consumption levels, and a request ID. The throttling service 307 reconciles a cumulative amount of output tokens for the resource created by the ApplyThrottle call and a cumulative amount of input tokens for the resource created by the ApplyThrottle call.

Finally, when the inference request is complete and the connection is being released the resource is deleted by calling ResolveThrottle. A ResolveThrottle request includes a resource ID, model ID, and namespace, and may include a request ID.

Figure 7:
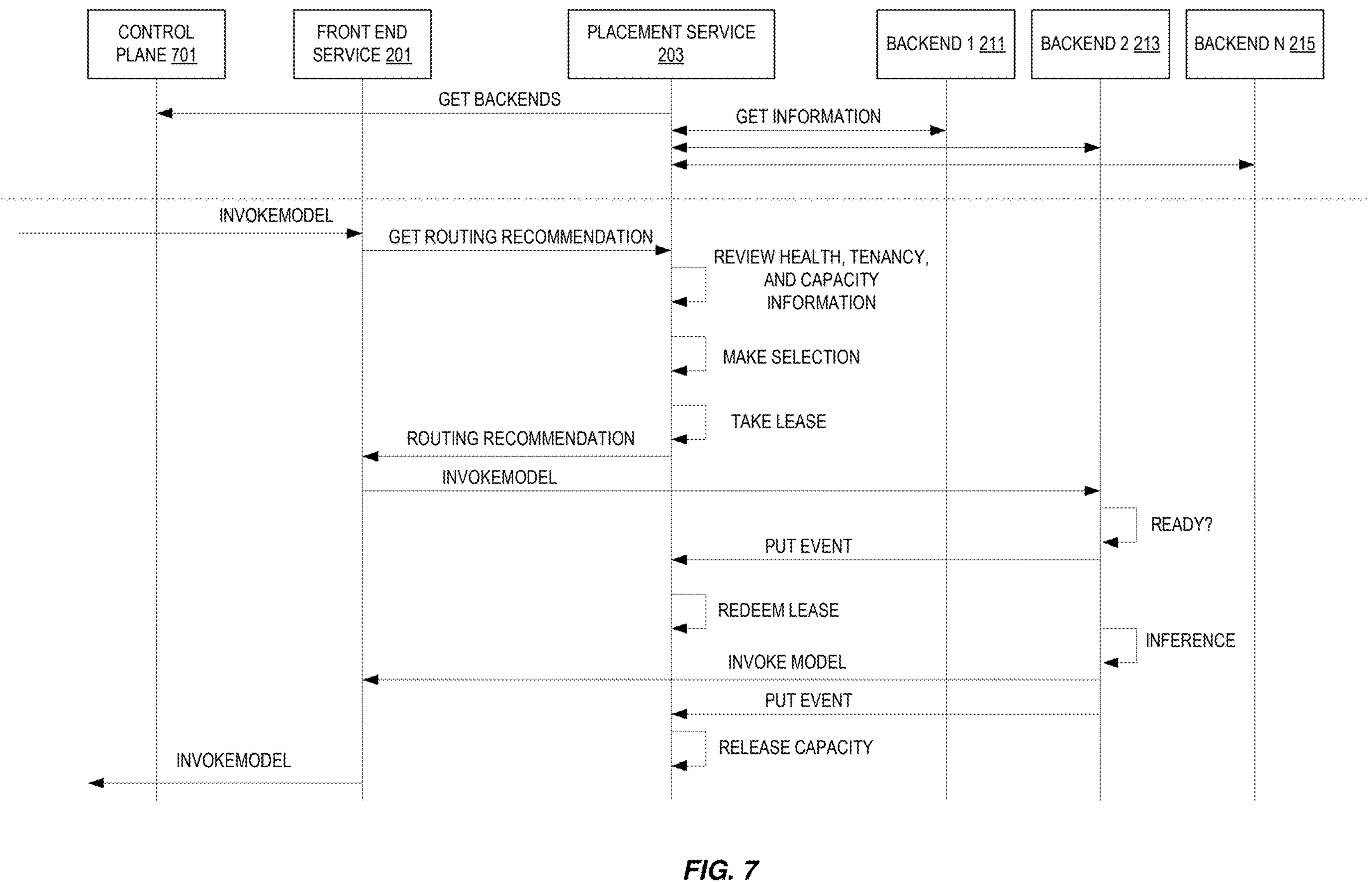
FIG. 7 illustrates examples of usage of a placement service.

FIG. 7 illustrates examples of usage of a placement service. As shown, the placement service 203 uses a control plane 701 to get capacity information, etc. from the backend 1 211, backend 2 213, or backend N 215.

The FES 201 gets an invoke model request (e.g., at the FES 201) on a dataplane and asks the placement service 203 for a routing recommendation. The placement service 203 reviews information about the backends such as health, tenancy, capacity information, etc. to make a selection. Note that the backends may update their information at different points in time. For example, in some cases, the backends update the placement service 203 with health information periodically. Tenancy and capacity may be updated when a tenancy starts or ends.

The placement service 203 takes a lease for the selected backend and provides a routing recommendation through the FES 201. In this example, backend 2 213 has been selected.

The FES 201 then makes an invoke model call to the selected backend (e.g., backend 2 213) and the selected backend determines if it can serve the inference request. If not, then the FES 201 is alerted in some examples so that it can ask the placement service 203 for another selection. In other examples, the placement service 203 is alerted so that it can release the lease and make a new selection.

If the backend is ready, it updates the placement service 203 that the backend will serve the request and the placement service 203 will redeem the lease on the backend's behalf. The backend 2 213 performs the inference and provides a result back to the FES 201. The backend 2 213 also updates the placement service 203 to release the lease and free up capacity (and, in some examples, indicate that it no longer has a tenant). The FES 201 provides the result to the requester.

Figure 8:
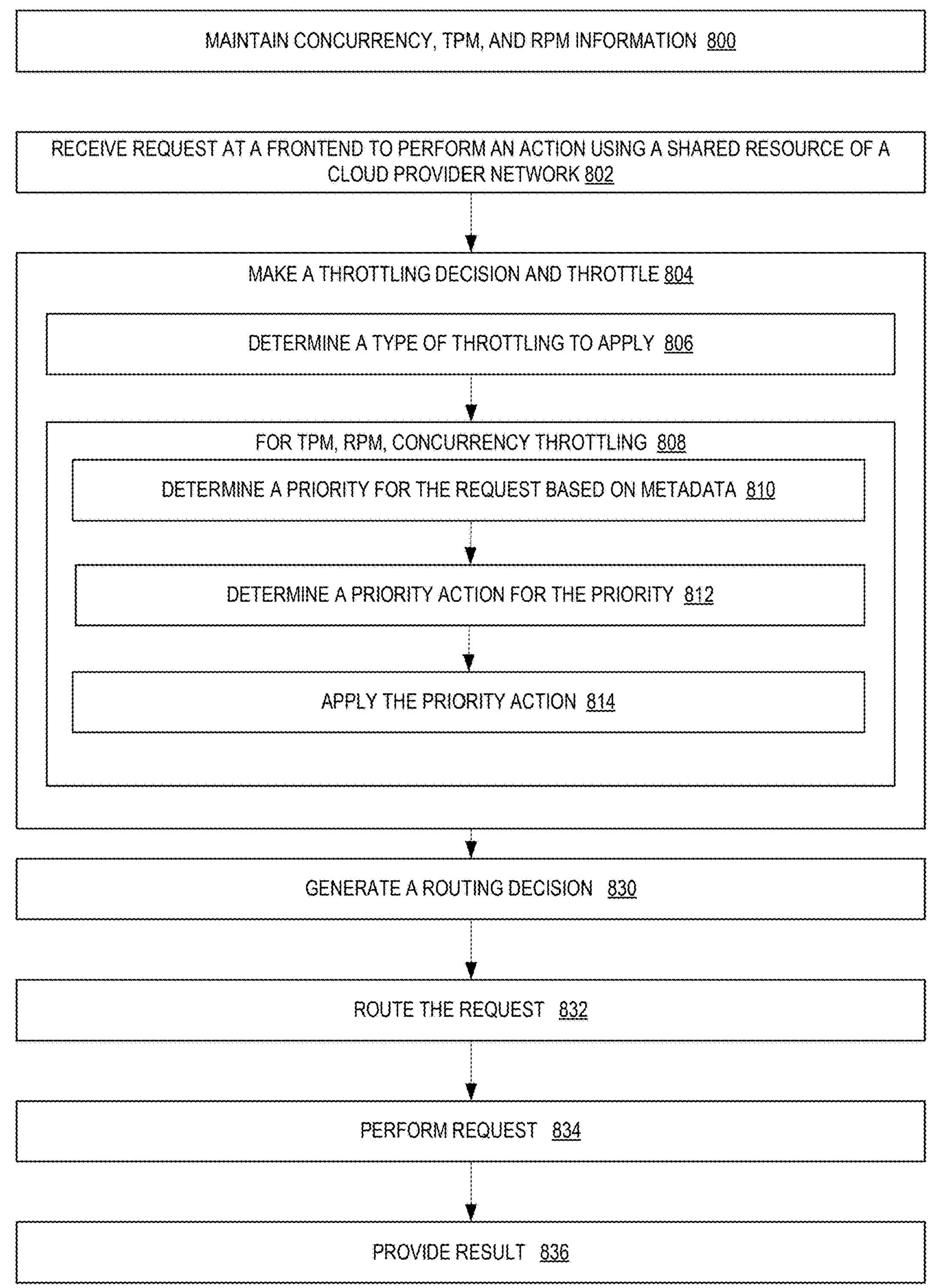
FIG. 8 is a flow diagram illustrating operations of a method for at least performing throttling according to some examples.

FIG. 8 is a flow diagram illustrating operations of a method for at least performing throttling according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by an shared resource service such as the FM service of the other figures.

Concurrency, TPM, and RPM information are maintained at 800. This maintenance may happen externally to the flow(s) described below or be a part of the flow. For example, limits may be updated to reflect a request from a user outside of the throttling flow and one or more buckets and/or concurrency information may be update in response to a request.

A request is received at the frontend to perform an action using a shared resource of a cloud provider network 802. The request may include information such as an identifier of the base resource (e.g., a model ID), an identifier of the provisioned throughput resource (e.g., an identifier of the provisioned resource), a desired amount of the resource to use, a requested TPM, a requested RPM, etc. In some examples, the request is an InvokeModel request.

A throttling decision is made at and the throttle applied at 804. A type of throttling to apply is determined at 806 in some examples. For example, the FES 201 or placement service 203 makes a determination of what type of throttling to apply. In some examples, the request provides information for the throttle type such as a TPM value. In some examples, the decision is made by looking up a stored throttling profile for the account-resource pair. In some examples, the throttling decision is made in response to an ApplyThrottle API call from a FES 201.

One or more of TPM, RPM, and/or concurrency-based throttling is performed at 808. A priority for the request is determined based on metadata at 810. Examples of metadata include one or more of an indication of an internal account submitted the request, an indication of an external account submitted the request, the requesting account is a production account, the requesting account is a non-production account, an account score, an account risk status, trailing days of usage of the service, etc. In some examples, a policy is evaluated by a DAC rules engine to determine the priority.

A priority action is determined for the determined priority at 812. In some examples, a policy is evaluated by a DAC rules engine to determine the priority. Actions are account specific in some examples and are used to reserve or limit concurrency for the request.

The priority action is applied at 814. Note that the application of the priority action may impact other users. For example, concurrency may be limited for batches, etc. In some examples, for TPM or RPM the priority action is to determine applicable limits, determine if throttling should occur, and then perform whatever throttling is determined. In some examples, service quotas are acquired for the account, model, etc. In some examples, limits are expressed through the use of tokens and token buckets. For example, a limit may be 1000 TPM. An example of determining if throttling should occur is if the limit is 1000 TPM and the request would exceed this limit, then the request would be denied. If the limit would not be exceeded it is allowed and the token buckets updated. In some examples a token bucket algorithm is applied to make this determination. In some examples, the FES 201 and throttling service 307 interact through a series of API calls to update the token bucket(s) (e.g., using a ReconcileThrottle call).

Note that if a type of throttling is not determined at 806 (either that act is not performed or no decision is made), in some examples all types of throttling are attempted and the action to perform would be none if a type of throttling was not correct.

In some examples, a ResolveThrottle call is used to release a throttle and free up tokens.

A routing decision is generated at 830. For example, a routing service 306 makes a routing decision. The routing decision takes into account information from one or more backends such as their capacity, tenancy, health information, type of compute resources, etc. In some examples, a lease is taken for the selected backend such that the placement service 203 is aware of the backend's potential usage. In some examples, token information (e.g., the number of tokens in the request) is used to check against capacity.

The request is routed per the recommendation at 832. In some examples, the request may be either accepted (and immediately processed), rejected, or placed in a queue to be acted on later. In some examples, the queue is priority-based with the order in the queue being determined by the priority. For example, batch requests would get a lower priority in the queue than on-demand requests.

In some examples, when a recommendation is made, the FES 201 communicates with the recommended backend(s) which redeem(s) a lease from the placement service and performs the request at 834. As noted above, a request may be for inference using an FM.

A result of the request performance is provided at 836. In some examples, the backend will also release the lease at the placement service.

An existing on-demand inference solution for a FM service does not provide guaranteed throughput which leads to potential throttling during peak times. In some examples, a performance tier (PTV2) is supported that allows users to reserve a guaranteed throughput in TPM for generative AI workloads. This enables a user to: 1) provision pre-defined bundles of input and output throughput separately; 2) reserve throughput capacity at the foundation model level; and/or 3) adjust provisioned throughput dynamically to match evolving workload demands. By reserving throughput, customers can ensure consistent performance and maintain the responsiveness of their production generative AI applications without the risk of throttling during peak demand periods. In some examples, performance tier workloads are routed to more capable backends of the backends when other, less capable backends could service the workload (but not at the desired throughput).

Figure 9:
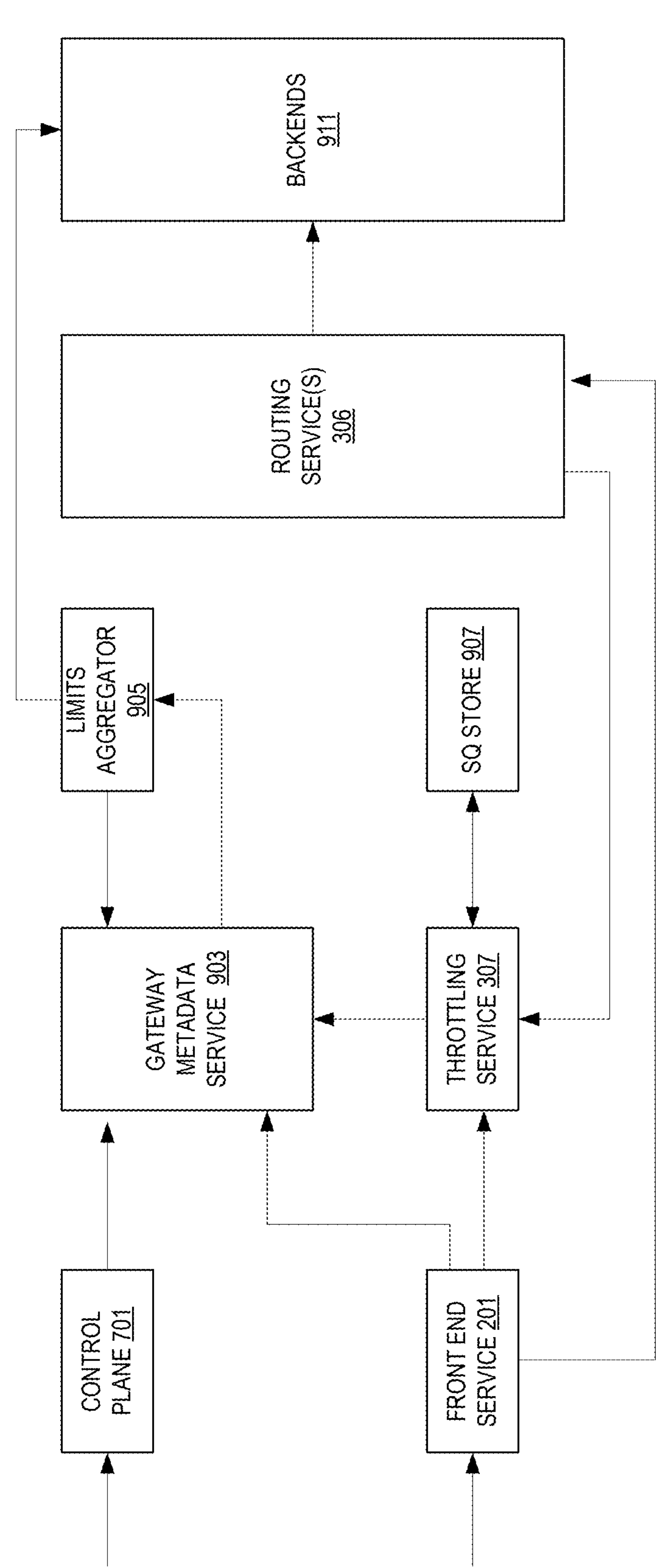
FIG. 9 illustrates examples of a performance tier implementation.

FIG. 9 illustrates examples of a performance tier implementation. Users can interact with the control plane 701 to perform Create, Read, Update, Delete, List (CRUDL) operations for reservations and provisioning using one or more APIs. The control plane 701 acts as the initial interface to authenticate and authorize customer requests using an identity and access management service.

Upon receiving an authorized and valid request, the control plane 701 communicates with a Gateway Metadata Service (GMDS) 903 which handles internal PTV2 logic and data storage. GMDS 903 updates its internal data stores with reservation or provisioning details (e.g., pending PTV2 jobs) and prepares the necessary data for synchronization with the throttling service 307. In some examples, the GMDS 903 manages the creation and updates of PTv2 resources such as reserved throughput, status, etc.

A limits aggregator 905 aggregates the total concurrent connections available across all backends 911. The limits aggregator 905 provides APIs to retrieve total regional concurrency per model and variant. As such, the limits aggregator 905 provides the GMDS 903 with "connection limits."

A background sweeper of the GMDS 903 fetches pending performance tier resources that need processing. For every pending performance tier resource update, the sweeper kicks off a workflow of the GMDS 903 that checks for the global limits available for the performance tier and accordingly puts a pending performance tier resource in a ready state and publishes resource status change events.

The throttling service 307 helps enforce throughput limits based on TPM and concurrency. The throttling service 307 syncs with GMDS 903 to retrieve the latest reservation and provisioning data including mappings from model-level TPM to variant-level concurrency reservations. With this up-to-date information, the throttling service 307 ensures accurate enforcement of throughput on-demand limits (e.g., from the SQ store 907) when processing inference requests from the data plane.

When a user invokes a models via the FES 201, the FES 201 receives the request and performs initial throttling checks by calling the ApplyThrottle API discussed above. This throttling check is that the TPM level. If the request passes the throttling checks, FES 201 forwards the request to the appropriate routing service of routing service(s) 306 which forwards the request to the correct backend of backends 911 (e.g., the backend for the requested model variant) for execution.

In some examples, the routing service(s) 306 perform concurrency level throttling, even for single-variant models to keep the approach consistent and extensible across models. They will perform this throttling by interacting with the throttling service 307 to enforce concurrency level limits. The request is sent to the relevant backend where the model processes the inference and generates a response.

The circles with numbers in them represent an example flow. At circle 1, a user requests the provisioning or reservation of a resource. At circle 2, the control plane 701 performs validation checks, creates a PTV2 resource in the GMDS 903, and/or publishes metering events.

At circle 3, the GMDS 903 invokes fetches pending PTV2 jobs, invokes the workflow for the fetched jobs, requests and receives limit information from the limits aggregator 905, and updates the pending PTV2 jobs (to mark a fetched job as ready.

At circle 4, a user invokes a model in a performance tier through the FES 201. The FES 201 gets the PTV2 model information from the GMDS 903 at circle 5 and calls ApplyThrottle for the model at circle 6. The FES 201 uses the throttle information to invoke the corrected routing service at circle 7. The routing service calls ApplyThrottle to get a concurrency value from the throttling service 307 and invokes the model in the correct backend.

In some examples, usage data is collected from the FES 201, routing services 306, and/or backends 911. Metrics such as throughput allocated, throughput used, invocation counts, success rates, and throttle rates are aggregated and sent to a metrics service. Users can access this data through metrics and dashboards, allowing them to monitor their throughput usage and system performance.

Figure 10:
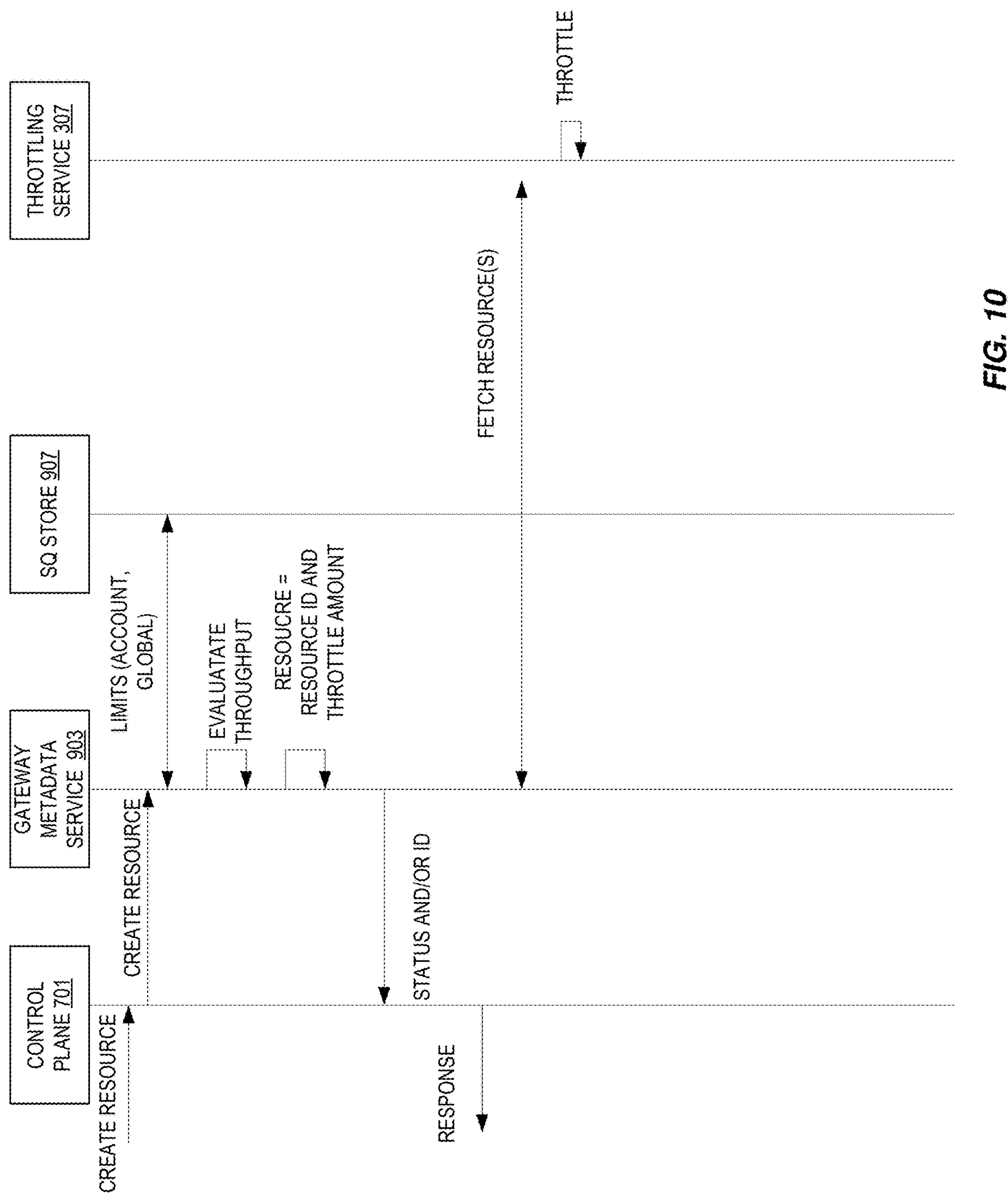
FIG. 10 illustrates a flow for the creation of reservation or provisioning resource for a performance tier.

FIG. 10 illustrates a flow for the creation of reservation or provisioning resource for a performance tier. In this illustration, a user calls a create resource API call to the control plane 701. The create resource call specifies the foundation model to use and the desired input and/or output throughput. The control plane authenticates and authorizes the request. The reservation or provisioning is associated with a resource object that can be modified, deleted, etc., but that includes information about the reservation or provisioning.

A GMDS 903 receives this information and acquires limits for the model, limits for the account associated with the create resource request from the SQ store 907, and/or global limits. The GMDS 903 verifies the requested throughput, model availability, etc. If the checks pass, GMDSFE 1001 stores the reservation details (e.g., mappings of model-level TPM reservations to variant-level concurrencies) in its datastore and generates a resource name (RN) to uniquely identify the reservation. In some examples, the status in the resource is marked as "creating."

The control plane 701 receives the RN from GMDS 903 and returns it, along with the reservation confirmation, to the requester.

The throttling service 307 performs a periodic sync process to retrieve the latest reservation and provisioning data from the GMDS 903. The GMDS 903 responds by providing the requested data, including mappings of model-level TPM reservations to variant-level concurrencies. Upon receiving this data, throttling service 307 logs the successful sync, and any anomalies that may occur during the process are monitored and alerted upon.

In some examples, users reserve throughput in TPM. In some examples, TPM needs to be converted to concurrencies for more accurate throttling. In some examples, a heuristic-based conversion formula that calculates the required concurrency based on average tokens per request (ATPR) and average processing time per request (APTR) is used. The formula considers factors like input and output token counts and processing times to estimate the number of concurrent requests that can be handled without exceeding the TPM limit. In some examples, a uniform model (e.g., where all users are treated the same) is used to establish a baseline and then non-uniform models can be used to implement per-customer adjustments, if needed, where significant deviations are observed. In some examples, a machine learning model is trained to predict concurrency conversions.

Figure 11:
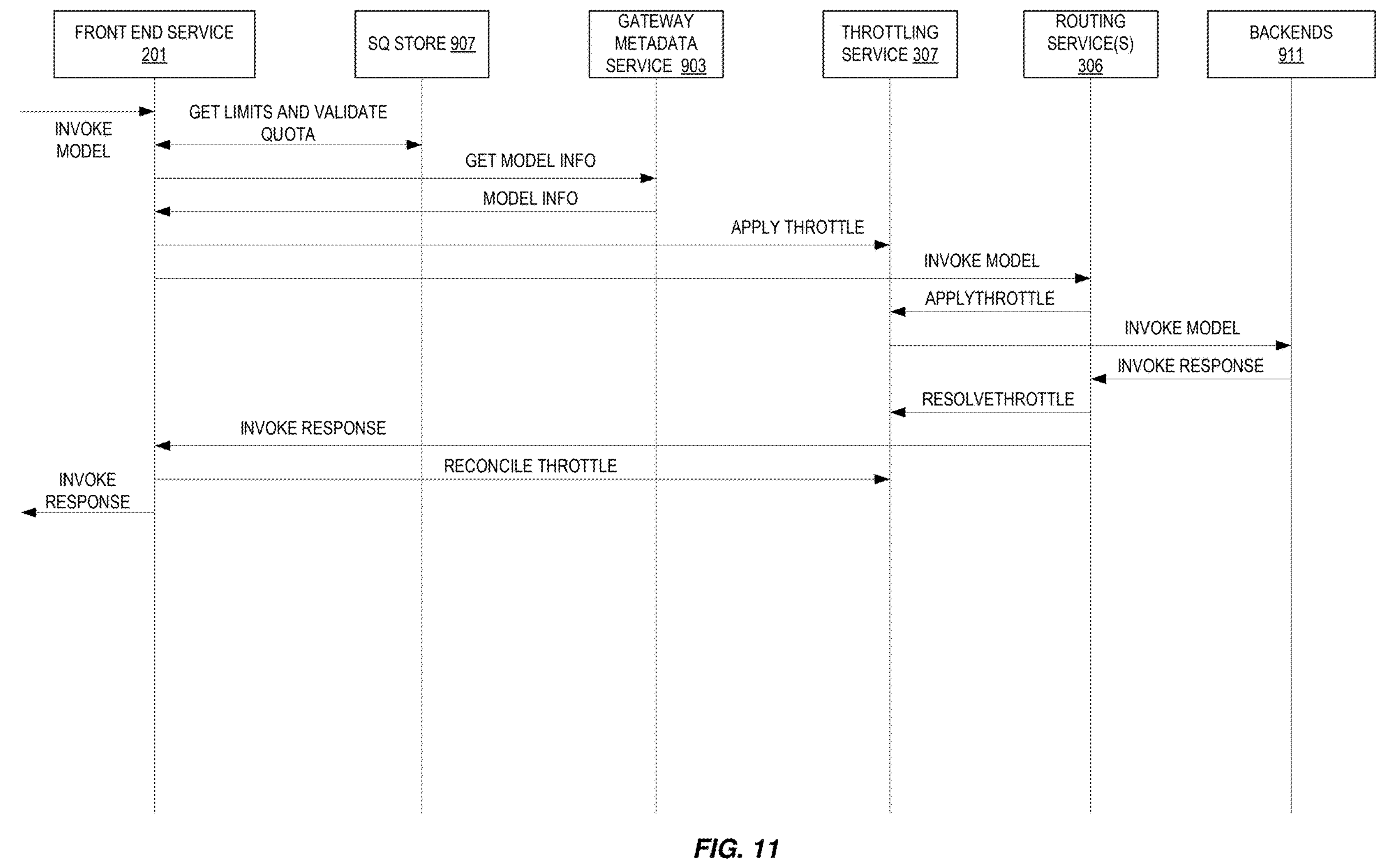
FIG. 11 illustrates examples of inference invocation for a performance tier.

FIG. 11 illustrates examples of inference invocation for a performance tier. As shown, the FES 201 receives a request to invoke a model using a performance tier for a provisioned in RN. The FES 201 authenticates the request and extracts the RN.

The FES 201 gets limits from the SQs 907 and validates the quota(s) for the model and/or user. The FES 201 then gets information about the model from the GMDS 903. The FES 201 uses the invoke model request and model information to call ApplyThrottle with the RN for a throttle check. Note this ApplyThrottle check is TPM based and provides an estimate of the token count to be used.

The throttling service 307 checks the TPM limits based on the provisioned throughput. If the request passes the throttling check, FES 201 forwards it to the routing service(s) 306, which determines the appropriate model variant. The routing service 306 then calls the throttling service 307 with variant-specific information for a variant-level throttling check where the throttling service 307 enforces the variant-level concurrency limits (e.g., an ApplyThrottle check is made from the routing service(s) 306 using concurrency, not TPM).

If the request passes this check, the routing service 306 forwards it to the appropriate backend 911 for model execution. The backend 911 processes the inference request, and the response is sent back through the routing service 306 and FES 201 to the requester. Note that the routing service 306 resolves the throttle (deletes it) and the FES 201 reconciles the throttle (updates it the throttling service 307 with actual usage token counts).

Figure 12:
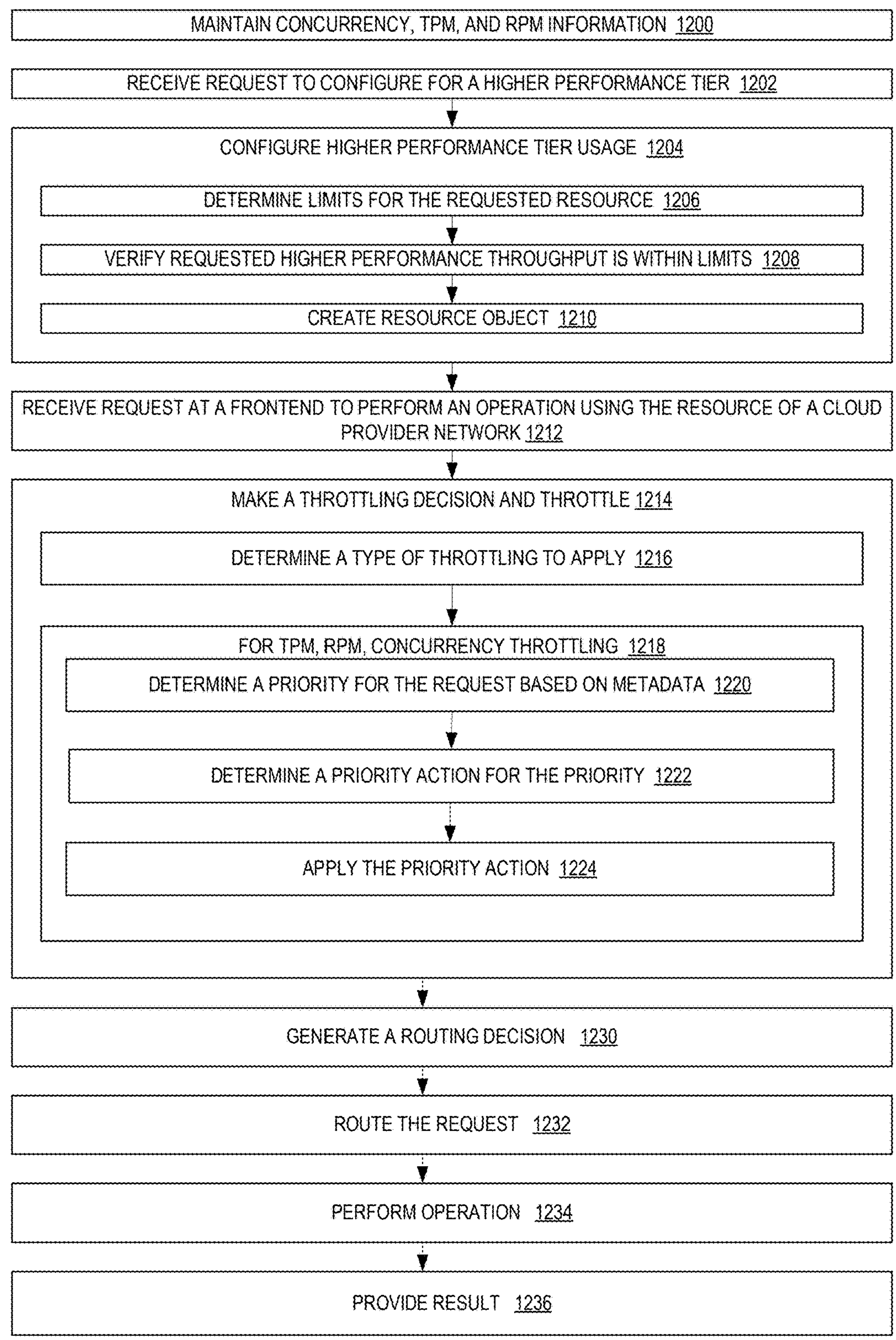
FIG. 12 is a flow diagram illustrating operations of a method for at least performing throttling according to some examples.

FIG. 12 is a flow diagram illustrating operations of a method for at least performing throttling according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications)

executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by an shared resource service such as the FM service of the other figures.

Concurrency, TPM, and RPM information are maintained at 1200. This maintenance may happen externally to the flow(s) described below or be a part of the flow. For example, limits may be updated to reflect a request from a user outside of the throttling flow and one or more buckets and/or concurrency information may be update in response to a request.

A request to configure for a higher performance tier for a shared resource is received at 1202. In some examples, a create resource API call is received. The create resource call specifies the foundation model to use and the desired input and/or output throughput and creates a resource object that defines these parameters The higher performance tier usage is configured at 1204. The configuration may include one or more acts. In some examples, limits for the requested resource are determined at 1206. For example, SQ is consulted for limits.

A verification of if the requested higher performance throughput is within limits is made at 1208.

If the requested higher performance throughput is within the limits, a resource object is created at 1210. This resource object defines the throughput, account-resource pair, etc. In some examples, the resource object is implemented in a metadata table.

At

A request is received at a frontend to perform an operation using the resource of a cloud provider network 1212. The request may include information such as an identifier of the base resource (e.g., a model ID), an identifier of the provisioned throughput resource (e.g., an identifier of the provisioned resource), a desired amount of the resource to use, a requested TPM, a requested RPM, etc. In some examples, the request is an InvokeModel request.

A throttling decision is made at and the throttle applied at 1214. A type of throttling to apply is determined at 1220. For example, the FES 201 or placement service 203 makes a determination of what type of throttling to apply. In some examples, the request provides information for the throttle type such as a TPM value. In some examples, the decision is made by looking up a stored throttling profile for the account-resource pair. In some examples, the throttling decision is made in response to an ApplyThrottle API call from a FES 201.

One or more of TPM, RPM, higher-priority, and/or concurrency-based throttling is performed at 1216. A priority for the request is determined based on metadata at 1220. Examples of metadata include one or more of an indication of an internal account submitted the request, an indication of an external account submitted the request, the requesting account is a production account, the requesting account is a non-production account, an account score, an account risk status, trailing days of usage of the service, etc. In some examples, a policy is evaluated by a DAC rules engine to determine the priority.

A priority action is determined for the determined priority at 1222. In some examples, a policy is evaluated by a DAC rules engine to determine the priority. Actions are account specific in some examples and are used to reserve or limit concurrency for the request.

The priority action is applied at 1224. Note that the application of the priority action may impact other users. For example, concurrency may be limited for batches, etc. In some examples, for TPM or RPM the priority action is to determine applicable limits, determine if throttling should occur, and then perform whatever throttling is determined. In some examples, service quotas are acquired for the account, model, etc. In some examples, limits are expressed through the use of tokens and token buckets. For example, a limit may be 1000 TPM. An example of determining if throttling should occur is In the higher performance tier, a quota is validated, and a throttle value is determined using concurrency. For example, a determination is made of if the guaranteed throughput is less than a TPM limit for the shared resource and a determination is made of if the guaranteed throughput is within a concurrency limit. Note that these determinations may be made by, or with, a routing service. In some examples, an ApplyThrottle call is made to the throttling service 307 from the FES 201 for the resource (e.g., using the resource object's identifier) using TPM. The call includes an estimated token count to be used. The throttling service 307 provides a check and if the check passes, then the FES 201 calls a routing service. The routing service calls ApplyThrottle with variant-specific information for a variant-level throttling check, where the throttling service 307 enforces the variant-level concurrency limits. The throttling service 307 converts TPM to concurrency.

A routing decision is generated at 1230. For example, a routing service 306 makes a routing decision. The routing decision takes into account information from one or more backends such as their capacity, tenancy, health information, type of compute resources, etc. In some examples, a lease is taken for the selected backend such that the placement service 203 is aware of the backend's potential usage. In some examples, token information (e.g., the number of tokens in the request) is used to check against capacity. In some examples, a higher priority resource is not specific to a particular backend. As such, a higher priority request may be sent to whatever resource is allowed to handle the request.

The request is routed per the recommendation at 1232. In some examples, the request may be either accepted (and immediately processed), rejected, or placed in a queue to be acted on later. In some examples, the queue is priority-based with the order in the queue being determined by the priority. For example, batch requests would get a lower priority in the queue than on-demand requests. Priority requests go to the top of the priority queue.

In some examples, when a recommendation is made, the FES 201 communicates with the recommended backend(s) which redeem(s) a lease from the placement service and performs the request at 1234. As noted above, a request may be for inference using an FM.

A result of the request performance is provided at 1236. In some examples, the backend will also release the lease at the placement service.

As noted above, in some examples, the FM service performs two types of admission control—quota-based and capacity-based. Quota admission control enforces customer-visible RPM and TPM quotas, returning a client error if quotas are exceeded. These quotas are defined per account, per model, and per region. Capacity admission control enforces concurrency limits against a downstream hosting fleet, returning a service error if the fleet is too busy to accept the request. Concurrency limits are defined per model, per region.

In some examples, the FM service supports cross-region inference. For cross-region endpoints, admission control is split between the originating region (the region against which the user makes their request) and the serving region (the region that executes the inference). The originating region applies quota-based admission control, and the serving region applies capacity-based admission control. This allows for the setting and enforcement of cross-region quotas without creating a situation where a user can get higher quotas by load balancing across originating regions (unless they get the necessary quotas in multiple originating regions). It also allows the cloud provider network to perform capacity admission control in the serving region with knowledge of load against the inference fleet.

There may be two problems with the above approaches. First, users wishing to make inference requests against multiple originating regions (for locality with application infrastructure or in pursuit of a multi-region architecture) must manage quotas in every originating region, even if the workload is against the same cross-region endpoint and underlying multi-region hosting infrastructure. Second, for the users that do manage to get the necessary quotas across originating regions, they can achieve higher overall usage by load-balancing. This creates situations where the FM service grants a customer quotas in multiple regions with a loose agreement that the customer will not consume against multiple regions at once.

In some examples, the FM service supports global endpoints that have many (e.g., dozens) serving regions instead of the relatively few behind existing cross-region endpoints. Both the user's quota management problem and FM service's quota risk with multiple originating regions are palatable for continental endpoints but unacceptable for global endpoints.

Examples detailed below describe approaches to enforce a global quota uniformly across all originating regions. A global quota is defined and exposed to the user per account, per model. Invokes against global endpoints will consume against the global quota, regardless of the originating region. In some examples, the global quota is maintained using a global token bucket (e.g., global token bucket 527) in at least a root region. The global token bucket is replicated in different regions in some examples.

Figure 13:
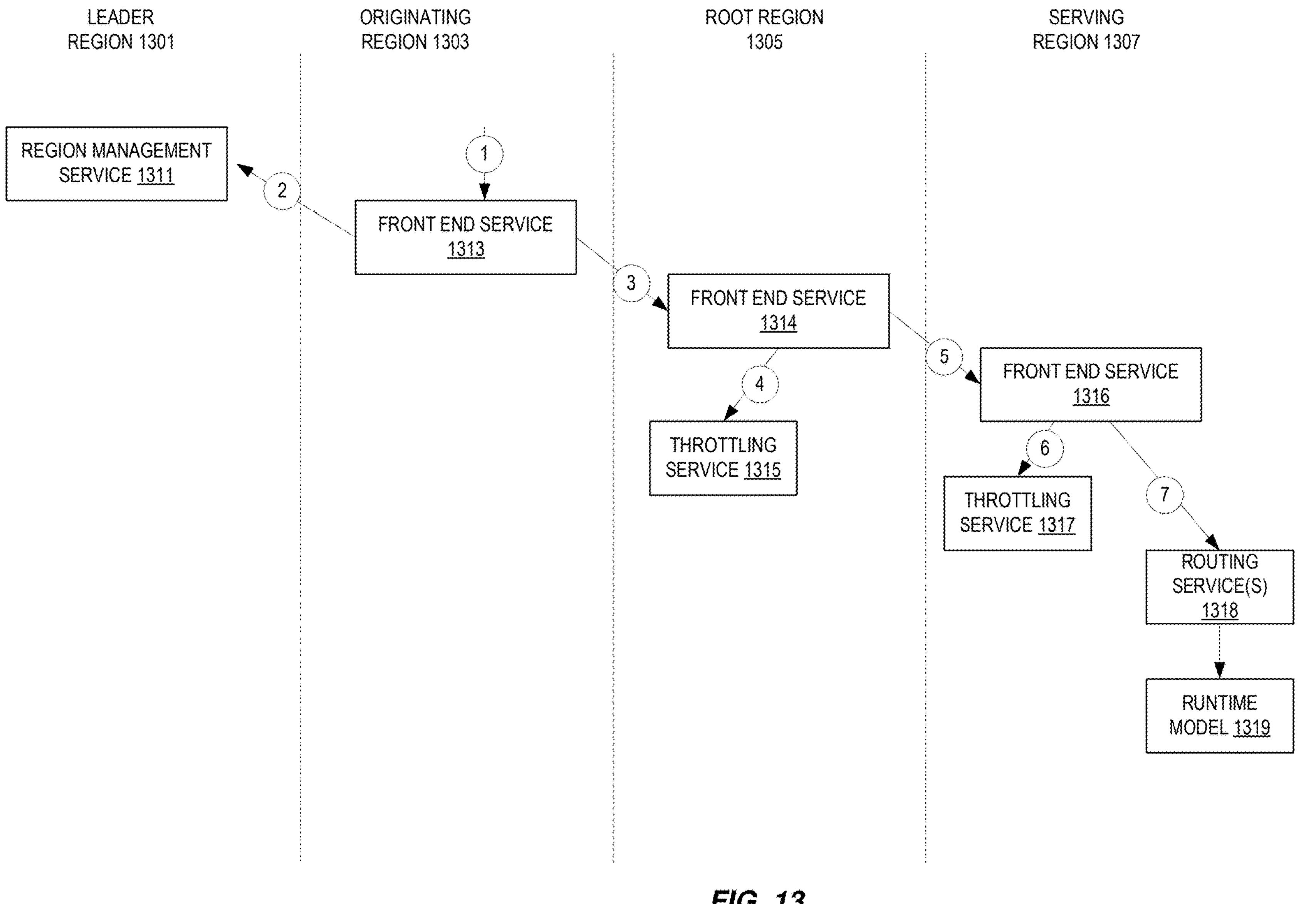
FIG. 13 illustrates examples of root region routing using a global quota.

FIG. 13 illustrates examples of root region routing using a global quota. A root region 1305 is set per account-endpoint pair. All inferences (from all originating regions 1303) are routed through that root region 1305 to a serving region 1307. In this illustration, circles with numbers inside show an example flow. There is a leader region 1301 that is fixed per cloud network provider partition, and it hosts a region management service 1311 which owns the mappings from account-endpoint pairs to the root region 1305.

The region management service 1311 is deployed once per cloud provider network partition and resolves an account-endpoint pair to its root region. This service may support "cold starts" in that calls to resolve an account-endpoint pair will set a root region for that pair if one does not already exist. The region management service 1311 implements logic to set root regions such that there is a reasonable distribution of root regions across accounts and endpoints. Calls to resolve a root region should be immutable, meaning FESes in originating regions can and should cache the results.

A user calls the originating region 1303 with a global endpoint at circle 1.

The FES 1313 in the originating region calls the leader region's 1301 region management service 1311 to resolve the root region 1305 for this account-endpoint pair. The region management service 1311 returns the root region 1305 to the FES 1313 in the originating region 1303 at circle 2. The FES 1313 caches the root region 1305 for future use.

The FES 1313 in the originating region 1303 invokes against the FES 1314 in the root region 1305 at circle 3.

The FES 1314 in the root region 1305 calls on a throttling service 1315 to perform RPM/TPM quota enforcement as described above at circle 4. From this point forward, requests are rejected if the quotas are breached. Note that this is the same root region 1305 across all originating regions 1303 for a given account and global endpoint, so RPM and TPM are configured and enforced globally. The root region 1305 may be different for different account-endpoints pairs.

The FES 1314 in the root region calls the FES 1316 in the selected serving region 1307 at circle 5. The FES 1316 in the serving region 1307 calls a throttling service 1317 to perform concurrency enforcement as detailed above. At this point requests are rejected if there is insufficient capacity to serve them.

The FES 1316 in the serving region 1307 calls the appropriate hosting platform using a routing service 1318 for the resolved model 1319.

Figure 14:
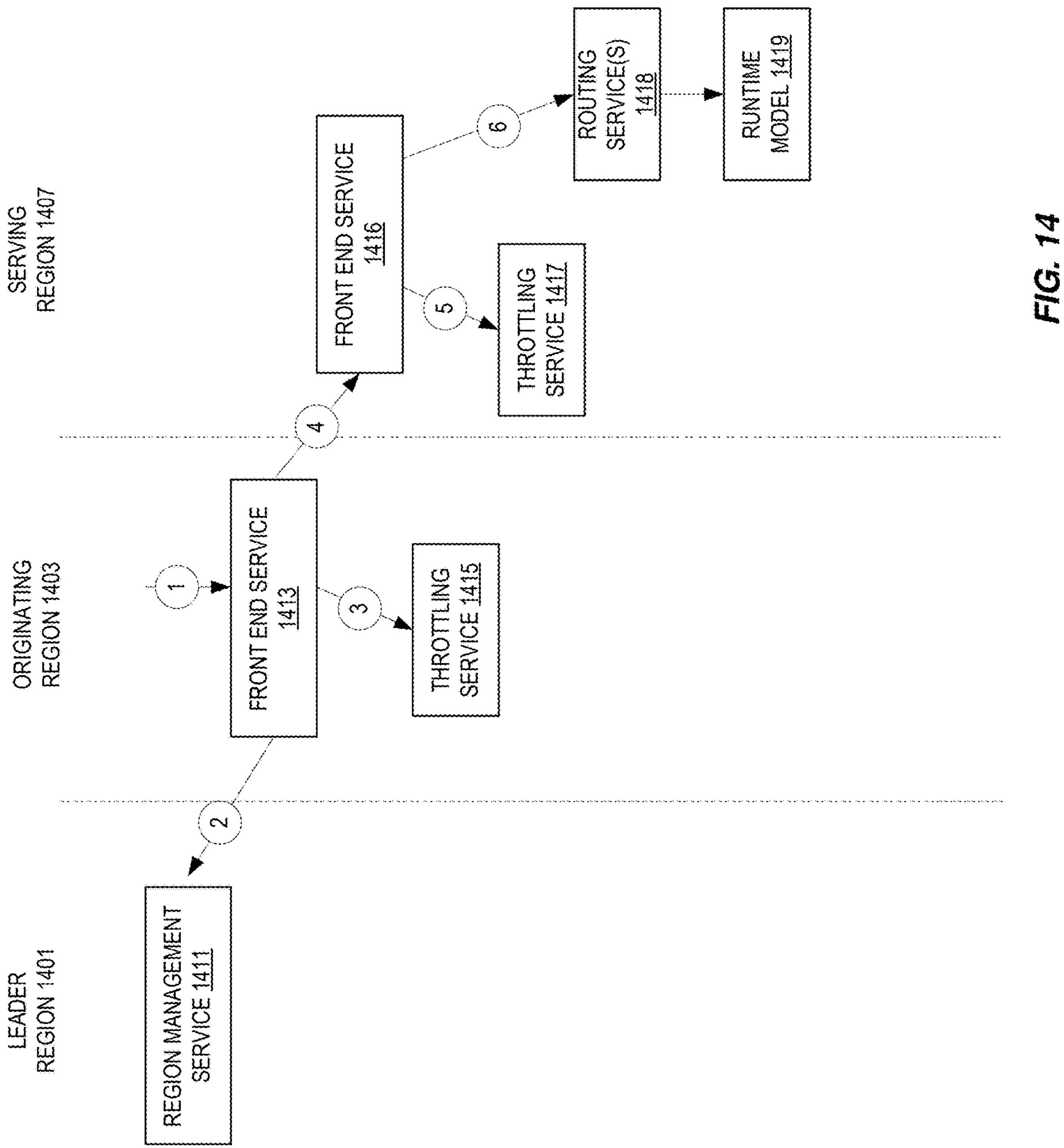
FIG. 14 illustrates examples of leader region quota leases.

FIG. 14 illustrates examples of leader region quota leases. This extends FIG. 13 by leveraging a partitional region management service to coordinate across originating regions. A difference is that instead of the region management service vending root region information to FES in the originating region, it vends quota leases. For instance, instead of the region management service instructing FES "route this account and endpoint through CMH" in instructs FES "throttle this account and endpoint at 100 RPM." Vending of a quota lease may be for more quota that previously held or less. For example, an originating or root region may know what quota is consumed and can preemptively increase or decrease a quota. In some examples, an originator may renegotiate a lease based on consumption rates.

A user calls the originating region 1403 with a global endpoint at circle 1.

The FES 1413 in the originating region calls the leader region's 1401 region management service 1411 to obtain a quota lease for the account-endpoint pair at circle 2. The RMS 1411 records the quota lease and returns it to FES 1413 in the originating region 1403. In some examples, in steady state the originating region 1403 may have an active quota lease, in which case it does not need to consult the RMS 1411. If the RMS 1411 has active leases against the full global quota for the account and endpoint it will communicate a failure to acquire quota lease back to FES 1413 which will reject the inference request.

At circle 3, the FES 1413 in the originating region 1403 calls a throttling service 1415 to perform RPM/TPM quota enforcement using the quota lease. At this point requests are rejected if quotas are breached. Note that quotas are enforced in multiple originating regions for a given account and global endpoint with the RMS 1411 acting as the point of coordination across them. The RMS contract is that the sum of all active quota leases is equal to (or less than) the customer-visible global quota.

The FES 1413 in the originating region 1403 calls the FES 1416 in the selected serving region 1407 at circle 4. The FES 1416 in the serving region 1407 calls the throttling service 1417 to perform concurrency enforcement. At this point requests are rejected if there is insufficient capacity to serve them. The end state is that RMS 1411 does no throttling and the throttling service 1417 is called by serving region FES 1416 in all cases.

The FES 1416 in the serving region 1407 calls the appropriate hosting platform for the resolved model 1419 using a routing service 1418.

Figure 15:
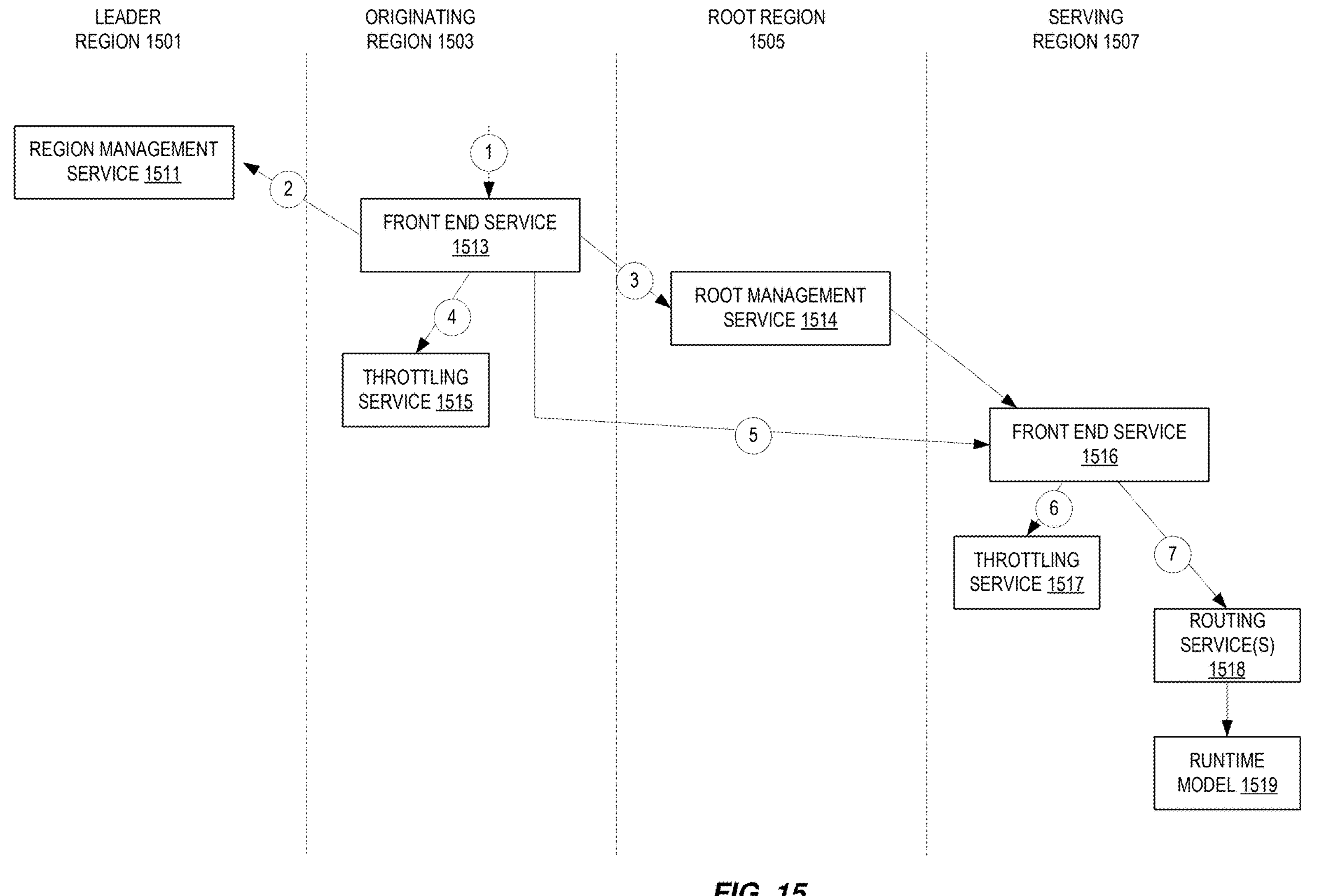
FIG. 15 illustrates examples of a hybrid approach.

FIG. 15 illustrates examples of a hybrid approach. This approach uses a partitional leader region for root region discovery by an originating region FES. The originating region FES then acquires a quota lease instead of routing the invoke, this time through the root region instead of the leader region.

A user calls the originating region 1503 with a global endpoint at circle 1.

The FES 1513 in the originating region calls the leader region's 1501 region management service 1511 to resolve the root region 1505 for this account-endpoint pair at circle 2. The region management service 1511 returns the root region 1505 to the FES 1513 in the originating region 1513 at circle 2. The FES 1513 caches the root region 1505 for future use.

The FES 1513 in the originating region 1503 calls the root region's 1505 RMS 1514 to obtain a quota lease for the account-endpoint pair. The RMS 1514 records the quota lease and returns it to the FES 1513 in the originating region 1503. In steady state the originating region 1503 may have an active quota lease, in which case does not need to consult the RMS 1514. If the RMS 1514 has active leases against the full global quota for the account and endpoint it will communicate failure to acquire quota lease back to the FES 1513 which will reject the inference request.

The FES 1513 in the originating region 1503 calls the throttling service 1515 to perform RPM/TPM quota enforcement using the quota lease. At this point requests are rejected if quotas are breached. Note that quotas are enforced in multiple originating regions for a given account and global endpoint. But the RMS 1514 acts as the point of coordination across them. The RMS 1514 contract is that the sum of all active quota leases is equal to (or less than) the customer-visible global quota.

The FES 1513 in the originating region 1503 calls the FES 1516 in the selected serving region 1507. The FES 1516 in the serving region 1507 calls the throttling service 1517 to perform concurrency enforcement. At this point requests are rejected if there is insufficient capacity to serve it.

The FES 1516 in the serving region 1507 calls the appropriate hosting platform for the resolved model 1519 using a routing service 1518.

Figure 16:
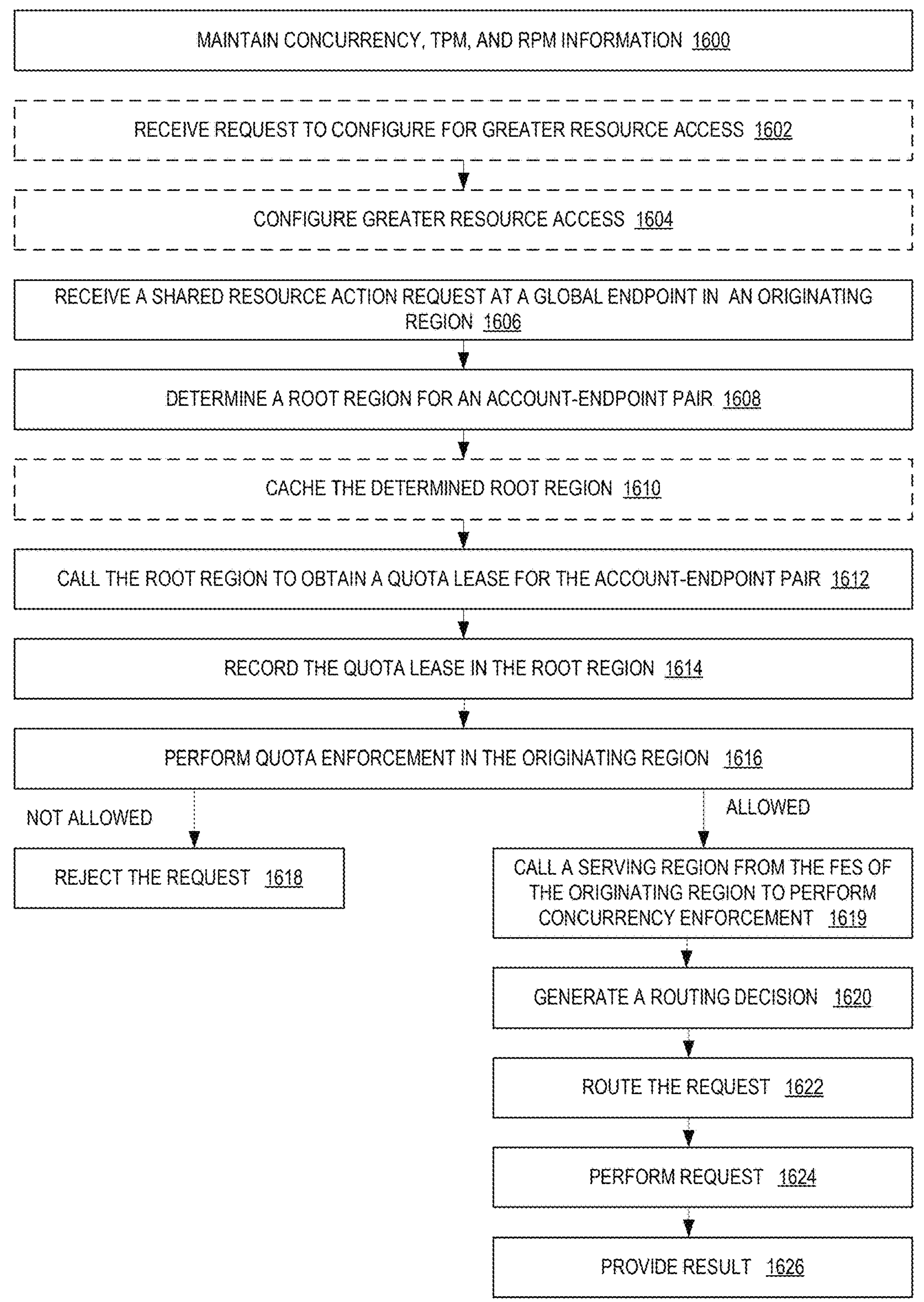
FIG. 16 is a flow diagram illustrating operations of a method for handing access to a shared resource according to some examples.

FIG. 16 is a flow diagram illustrating operations of a method for handing access to a shared resource according to some examples. Some or all of the operations (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations are performed by services such as the FM service(s) of the other figures.

Concurrency, TPM, and RPM information are maintained at 1600. This maintenance may happen externally to the flow(s) described below or be a part of the flow. For example, limits may be updated to reflect a request from a user outside of the throttling flow and one or more buckets and/or concurrency information may be update in response to a request.

In some examples, a request to configure for greater usage for a shared resource is received at 1602. For example, a user may configure for greater TPM, RPM, concurrency, etc.

In some examples, the greater usage is configured at 1604.

A shared resource action request (e.g., an inference request to a shared FM) is received at a global endpoint in an originating region at 1606. In some examples, a FES of the originating region receives the request.

A root region for an account-endpoint pair associated with the request is determined at 1608. For example, the account of the requester and the endpoint that received the request. In some examples, the FES of the originating region calls an RMS in a leader region to make this determination.

In some examples, the determined root region is cached at 1610. For example, the originating region caches the determined root region.

The root region is called by the originating region to obtain a quota lease for the account-endpoint pair at 1612. The quota lease is a lease against a global quota for the shared resource. For example, a quota lease assigns a subset of the global quota. The subset may be a proper subset or all of the quota (if no other entity is attempting to use the resource).

The quota lease is recorded in the root region at 1614 and returned to the originating region.

Quota enforcement is performed in the originating region using the quota lease 1616. For example, TPM and/or RPM quota enforcement is performed. If the request is not allowed, it is rejected at 1618.

If the request is allowed, a serving region is called from the FES of the originating region to perform concurrency enforcement at 1619. If there is sufficient concurrency, then a routing decision is generated at 1620. For example, a routing service 306 makes a routing decision. The routing decision takes into account information from one or more backends such as their capacity, tenancy, health information, etc. In some examples, a lease is taken for the selected backend such that the placement service 203 is aware of the backend's potential usage.

The request is routed per the recommendation at 1622. In some examples, when a recommendation is made, the FES 201 communicates with the recommended backend(s) which redeem(s) a lease from the placement service and performs the request at 1624. As noted above, a request may be for inference using an FM.

A result of the request performance is provided at 1626. In some examples, the backend will also release the lease at the placement service.

Figure 17:
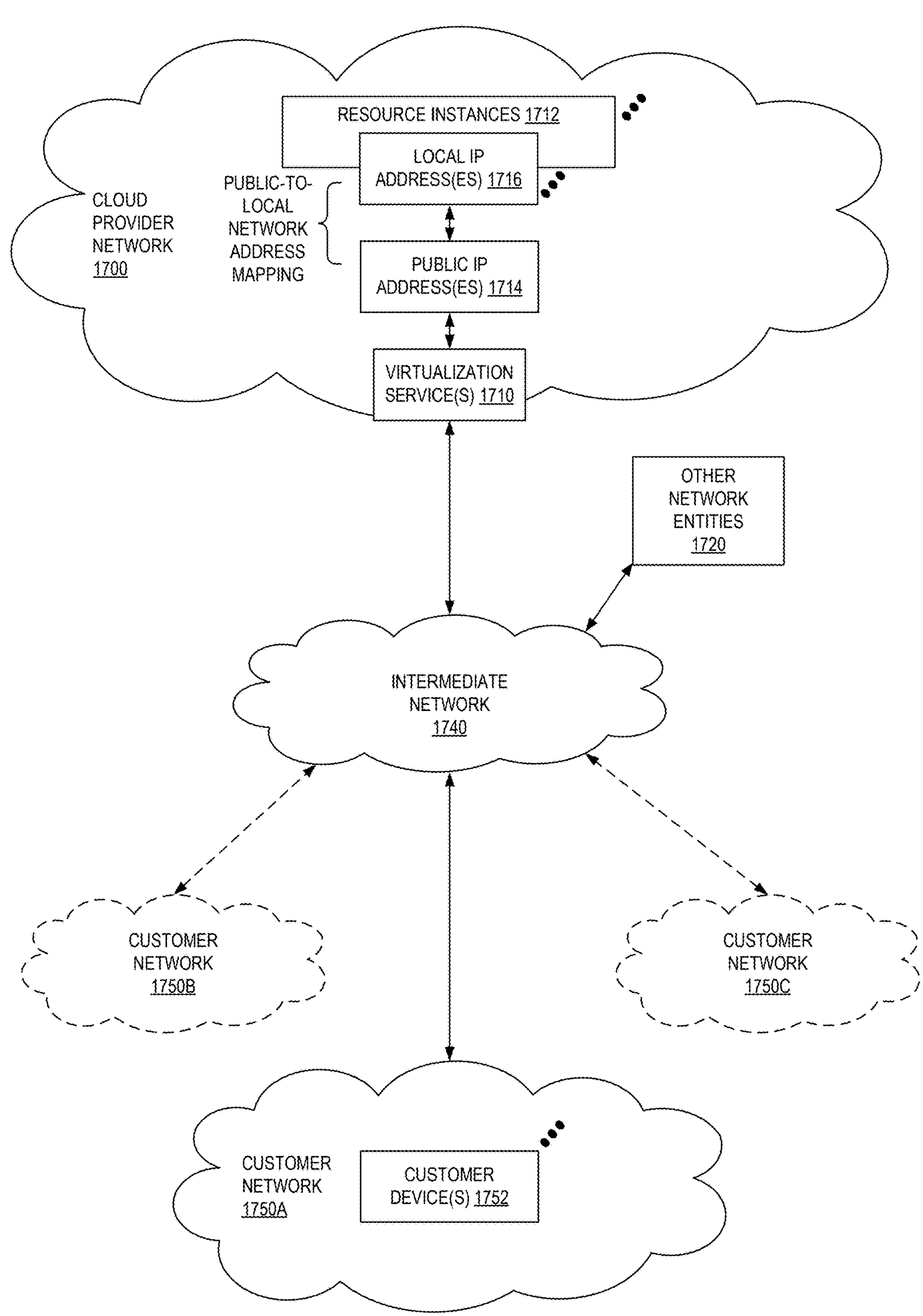
FIG. 17 illustrates an example cloud provider network environment according to some examples.

FIG. 17 illustrates an example provider network (or "service provider system") environment according to some examples. A provider network 1700 can provide resource virtualization to customers via one or more virtualization services 1710 that allow customers to purchase, rent, or otherwise obtain instances 1712 of virtualized resources, including but not limited to computation and storage resources, implemented on devices within the provider network or networks in one or more data centers. Local Internet Protocol (IP) addresses 1716 can be associated with the resource instances 1712; the local IP addresses are the internal network addresses of the resource instances 1712 on the provider network 1700. In some examples, the provider network 1700 can also provide public IP addresses 1714 and/or public IP address ranges (e.g., Internet Protocol version 4 (IPv4) or Internet Protocol version 6 (IPv6) addresses) that customers can obtain from the provider 1700.

Conventionally, the provider network 1700, via the virtualization services 1710, can allow a customer of the service provider (e.g., a customer that operates one or more customer networks 1750A-1750C (or "client networks") including one or more customer device(s) 1752) to dynamically associate at least some public IP addresses 1714 assigned or allocated to the customer with particular resource instances 1712 assigned to the customer. The provider network 1700 can also allow the customer to remap a public IP address 1714, previously mapped to one virtualized computing resource instance 1712 allocated to the customer, to another virtualized computing resource instance 1712 that is also allocated to the customer. Using the virtualized computing resource instances 1712 and public IP addresses 1714 provided by the service provider, a customer of the service provider such as the operator of the customer network(s) 1750A-1750C can, for example, implement customer-specific applications and present the customer's applications on an intermediate network 1740, such as the Internet. Other network entities 1720 on the intermediate network 1740 can then generate traffic to a destination public IP address 1714 published by the customer network(s) 1750A-1750C; the traffic is routed to the service provider data center, and at the data center is routed, via a network substrate, to the local IP address 1716 of the virtualized computing resource instance 1712 currently mapped to the destination public IP address 1714. Similarly, response traffic from the virtualized computing resource instance 1712 can be routed via the network substrate back onto the intermediate network 1740 to the source entity 1720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1700; a customer can then assign their allocated public IP addresses to particular resource instances allocated to the customer. These public IP addresses can be referred to as customer public IP addresses, or simply customer IP addresses. Instead of being assigned by the provider network 1700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 18:
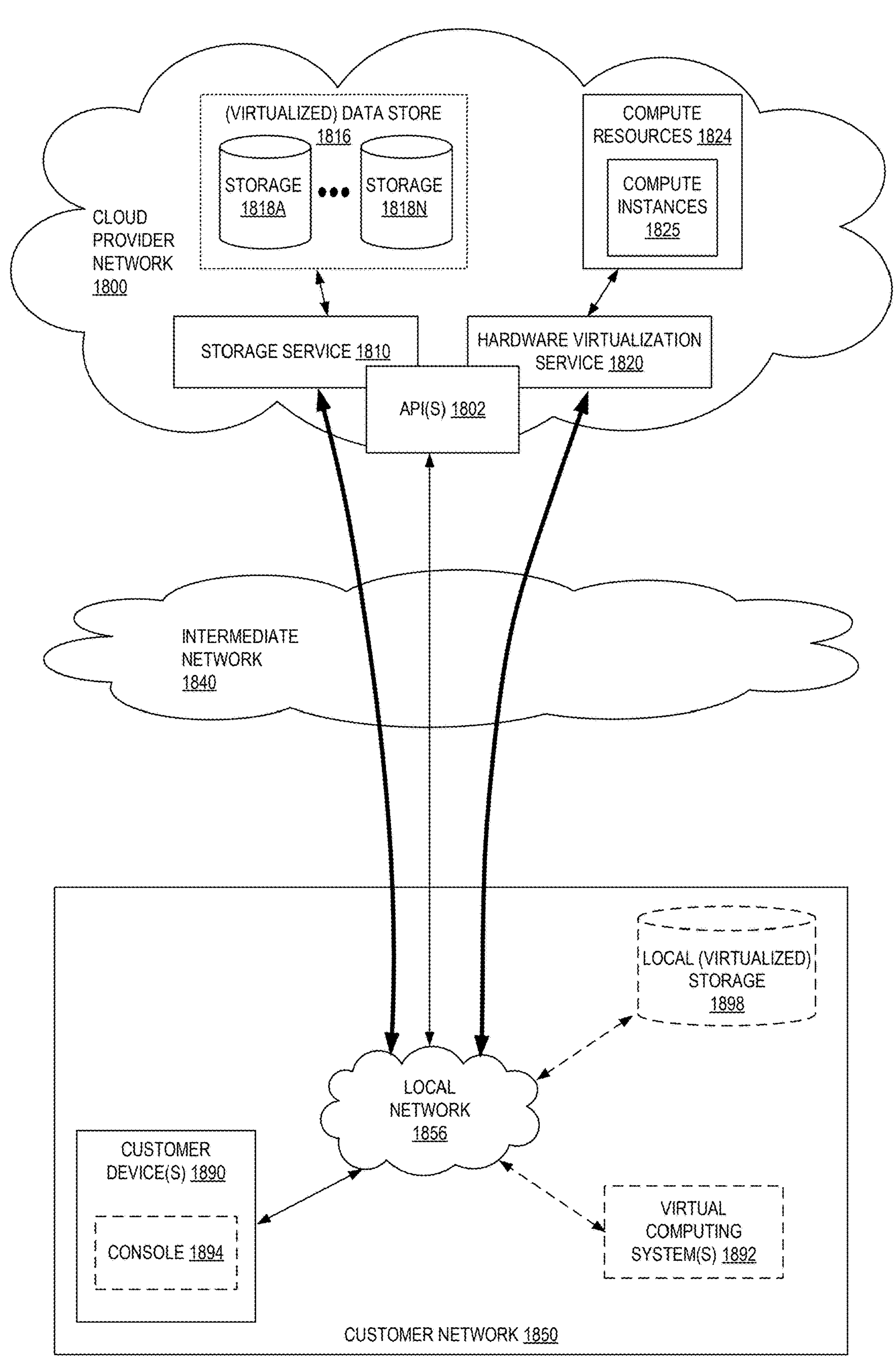
FIG. 18 is a block diagram of an example cloud provider network that provides a storage service and a hardware virtualization service to users according to some examples.

FIG. 18 is a block diagram of an example provider network environment that provides a storage service and a hardware virtualization service to users, according to some examples. A hardware virtualization service 1820 provides multiple compute resources 1824 (e.g., compute instances 1825, such as VMs) to users. The compute resources 1824 can, for example, be provided as a service to users (or "customers") of a provider network 1800 (e.g., to a customer that implements a customer network 1850). Each computation resource 1824 can be provided with one or more local IP addresses. The provider network 1800 can be configured to route packets from the local IP addresses of the compute resources 1824 to public Internet destinations, and from public Internet sources to the local IP addresses of the compute resources 1824.

The provider network 1800 can provide the customer network 1850, for example coupled to an intermediate network 1840 via a local network 1856, the ability to implement virtual computing systems 1892 via the hardware virtualization service 1820 coupled to the intermediate network 1840 and to the provider network 1800. In some examples, the hardware virtualization service 1820 can provide one or more APIs 1802, for example a web services interface, via which the customer network 1850 can access functionality provided by the hardware virtualization service 1820, for example via a console 1894 (e.g., a web-based application, standalone application, mobile application, etc.) of a customer device 1890. In some examples, at the provider network 1800, each virtual computing system 1892 at the customer network 1850 can correspond to a computation resource 1824 that is leased, rented, or otherwise provided to the customer network 1850.

From an instance of the virtual computing system(s) 1892 and/or another customer device 1890 (e.g., via console 1894), the customer can access the functionality of a storage service 1810, for example via the one or more APIs 1802, to access data from and store data to storage resources 1818A-1818N of a virtual data store 1816 (e.g., a folder or "bucket," a virtualized volume, a database, etc.) provided by the provider network 1800. In some examples, a virtualized data store gateway (not shown) can be provided at the customer network 1850 that can locally cache at least some data, for example frequently accessed or critical data, and that can communicate with the storage service 1810 via one or more communications channels to upload new or modified data from a local cache so that the primary store of data (the virtualized data store 1816) is maintained. In some examples, a user, via the virtual computing system 1892 and/or another customer device 1890, can mount and access virtual data store 1816 volumes via the storage service 1810 acting as a storage virtualization service, and these volumes can appear to the user as local (virtualized) storage 1898.

While not shown in FIG. 18, the virtualization service(s) can also be accessed from resource instances within the provider network 1800 via the API(s) 1802. For example, a customer, appliance service provider, or other entity can access a virtualization service from within a respective virtual network on the provider network 1800 via the API(s) 1802 to request allocation of one or more resource instances within the virtual network or within another virtual network.

Illustrative Systems

Figure 19:
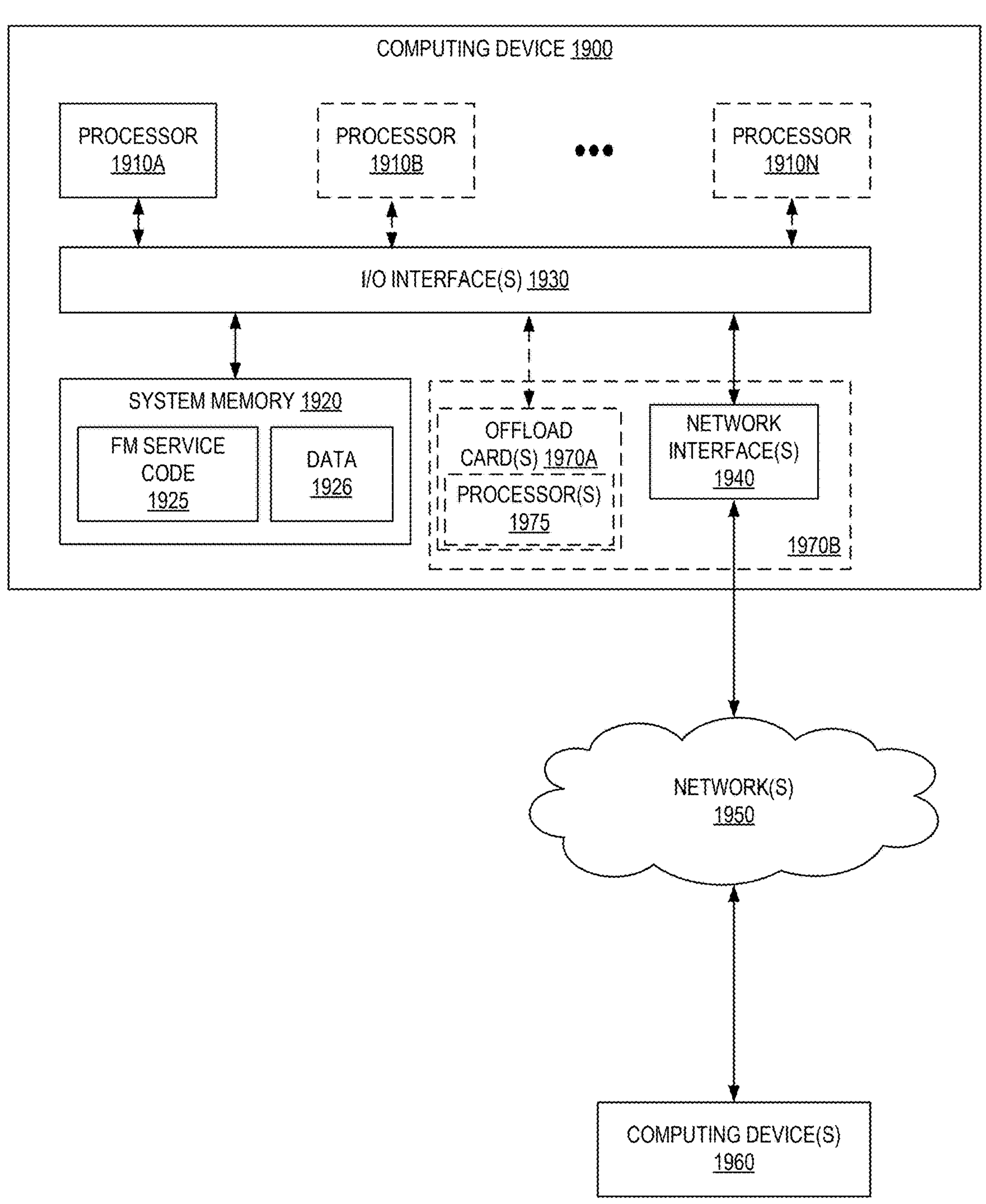
FIG. 19 is a block diagram illustrating an example computing device that can be used in some examples.

In some examples, a system that implements a portion or all of the techniques described herein can include a general-purpose computer system, such as the computing device 1900 (also referred to as a computing system or electronic device) illustrated in FIG. 19, that includes, or is configured to access, one or more computer-accessible media. In the illustrated example, the computing device 1900 includes one or more processors 1910 coupled to a system memory 1920 via an input/output (I/O) interface 1930. The computing device 1900 further includes a network interface 1940 coupled to the I/O interface 1930. While FIG. 19 shows the computing device 1900 as a single computing device, in various examples the computing device 1900 can include one computing device or any number of computing devices configured to work together as a single computing device 1900.

In various examples, the computing device 1900 can be a uniprocessor system including one processor 1910, or a multiprocessor system including several processors 1910 (e.g., two, four, eight, or another suitable number). The processor(s) 1910 can be any suitable processor(s) capable of executing instructions. For example, in various examples, the processor(s) 1910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1910 can commonly, but not necessarily, implement the same ISA.

The system memory 1920 can store instructions and data accessible by the processor(s) 1910. In various examples, the system memory 1920 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1920 as FM service code 1925 (e.g., executable to implement, in whole or in part, the FM service 160) and data 1926.

In some examples, the I/O interface 1930 can be configured to coordinate I/O traffic between the processor 1910, the system memory 1920, and any peripheral devices in the device, including the network interface 1940 and/or other peripheral interfaces (not shown). In some examples, the I/O interface 1930 can perform any necessary protocol, timing, or other data transformations to convert data signals from one component (e.g., the system memory 1920) into a format suitable for use by another component (e.g., the processor 1910). In some examples, the I/O interface 1930 can include support for devices attached through various types of peripheral buses, such as a variant of the Peripheral Component Interconnect (PCI) bus standard or the Universal Serial Bus (USB) standard, for example. In some examples, the function of the I/O interface 1930 can be split into two or more separate components, such as a north bridge and a south bridge, for example. Also, in some examples, some or all of the functionality of the I/O interface 1930, such as an interface to the system memory 1920, can be incorporated directly into the processor 1910.

The network interface 1940 can be configured to allow data to be exchanged between the computing device 1900 and other computing devices 1960 attached to a network or networks 1950, such as other computer systems or devices as illustrated in FIG. 1, for example. In various examples, the network interface 1940 can support communication via any suitable wired or wireless general data networks, such as types of Ethernet network, for example. Additionally, the network interface 1940 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1900 includes one or more offload cards 1970A or 1970B (including one or more processors 1975, and possibly including the one or more network interfaces 1940) that are connected using the I/O interface 1930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1900 can act as a host electronic device (e.g., operating as part of a hardware virtualization service) that hosts compute resources such as compute instances, and the one or more offload cards 1970A or 1970B execute a virtualization manager that can manage compute instances that execute on the host electronic device. As an example, in some examples the offload card(s) 1970A or 1970B can perform compute instance management operations, such as pausing and/or un-pausing compute instances, launching and/or terminating compute instances, performing memory transfer/copying operations, etc. These management operations can, in some examples, be performed by the offload card(s) 1970A or 1970B in coordination with a hypervisor (e.g., upon a request from a hypervisor) that is executed by the other processors 1910A-1910N of the computing device 1900. However, in some examples the virtualization manager implemented by the offload card(s) 1970A or 1970B can accommodate requests from other entities (e.g., from compute instances themselves), and cannot coordinate with (or service) any separate hypervisor.

In some examples, the system memory 1920 can be one example of a computer-accessible medium configured to store program instructions and data as described above. However, in other examples, program instructions and/or data can be received, sent, or stored upon different types of computer-accessible media. Generally, a computer-accessible medium can include any non-transitory storage media or memory media such as magnetic or optical media, e.g., disk or DVD/CD coupled to the computing device 1900 via the I/O interface 1930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1900 as the system memory 1920 or another type of memory. Further, a computer-accessible medium can include transmission media or signals such as electrical, electromagnetic, or digital signals, conveyed via a communication medium such as a network and/or a wireless link, such as can be implemented via the network interface 1940.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1818A-1818N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Accordingly, phrases such as "a set of devices configured to" or "a collection of devices configured to" are intended to include one or more recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C, where the second processor could be part of same computing device as the first processor or part of a separate computing device as the first processor.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:

receiving a request from an account to perform an operation using a shared resource at a global endpoint in a first type of region;

determining a second type of region for a pairing of the account and global endpoint, wherein all calls to the shared resource from any first type of region go through the second type of region;

calling the determined second type of region to obtain a quota lease for the pairing of the account and global endpoint, wherein a quota lease is a subset of a global quota for the shared resource;

recording the quota lease in the second type of region;

performing quota enforcement in the first type of region to determine the request can be serviced using the quota lease;

calling a third type of region to perform throttling enforcement for the request to determine the request can be serviced;

generating a routing decision for the request, wherein the routing decision is to route the request to a backend of a plurality of backends;

routing the request;

performing the operation; and providing a result of the operation.

2. The computer-implemented method of claim 1, further comprising:

maintaining concurrency information for the shared resource, tokens per minute (TPM) information, and requests per minute (RPM) information, wherein TPM and RPM are defined per account, per shared resource, per region of a cloud provider network.

3. The computer-implemented method of claim 1, further comprising:

caching the determined second type of region in the first type of region.

4. The computer-implemented method of claim 1, wherein the shared resource is a foundation model.

5. The computer-implemented method of claim 4, wherein the request is an inference request to the foundation model.

6. The computer-implemented method of claim 1, wherein the global quota is maintained by at least the second type of region.

7. The computer-implemented method of claim 1, wherein the throttling enforcement for the request in the servicing region is concurrency-based.

8. The computer-implemented method of claim 1, wherein the quota enforcement in the first type of region to is based on a tokens per minute quota.

9. The computer-implemented method of claim 1, wherein the quota enforcement in the first type of region to is based on a requests per minute quota.

10. The computer-implemented method of claim 1, wherein the routing decision is based at least in part on one or more of health information, tenancy information, and capacity information for the plurality of backends.

11. The computer-implemented method of claim 1, wherein a global endpoint has a plurality of third type of regions.

12. The computer-implemented method of claim 1, wherein the request is queued and performing the operation is done when capacity is available.

13. The computer-implemented method of claim 1, wherein the third type of region supports heterogenous backends.

14. The computer-implemented method of claim 1, wherein the quota lease is for additional quota.

15. The computer-implemented method of claim 1, wherein the quota lease is for less quota.

16. A system comprising:

a first one or more computing devices in a first type of region to support a foundation model service in a multi-tenant provider network;

a second one or more computing devices in a second type of region to support a foundation model service in a multi-tenant provider network;

a third one or more computing devices in a third type of region to support a foundation model service in a multi-tenant provider network;

a fourth one or more computing devices in a fourth region to support a foundation model service in a multi-tenant provider network, wherein the regions are to cooperate to:

receive a request from an account to perform an operation using a shared resource at a global endpoint in a first type of region;

determine a second type of region for determine a second type of region for a pairing of the account and global endpoint, wherein all calls to the shared resource from any first type of region go through the second type of region;

calling the determined second type of region to obtain a quota lease for the pairing of the account and global endpoint, wherein a quota lease is a subset of a global quota for the shared resource;

recording the quota lease in the second type of region;

performing quota enforcement in the first type of region to determine the request can be serviced using the quota lease;

calling a third type of region to perform throttling enforcement for the request to determine the request can be serviced;

generating a routing decision for the request, wherein the routing decision is to route the request to a backend of a plurality of backends;

routing the request;

performing the operation; and providing a result of the operation.

17. The system of claim 16, wherein the shared resource is a foundation model.

18. A computer-implemented method comprising:

receiving an inference request from an account for a foundation model at a global endpoint in an originating region;

determining a root region for a pairing of the account and global endpoint, wherein all calls to the foundation model from any originating region go through the root region;

calling the determined root region to obtain a quota lease for the pairing of the account and global endpoint, wherein a quota lease is a subset of a global quota for the foundation model;

recording the quota lease in the root region;

performing quota enforcement in the originating region to determine the request can be serviced using the quota lease;

calling a serving region to perform concurrency-based enforcement for the request to determine the request can be serviced;

generating a routing decision for the request, wherein the routing decision is to route the request to a backend of a plurality of backends;

routing the request;

performing the inference using the foundation model; and providing a result of the inference.

19. The computer-implemented method of claim 18, wherein the global quota is replicated across the regions.

20. The computer-implemented method of claim 18, wherein a global endpoint has a plurality of serving regions.

* * * * *